United States Patent [19]

Bjornsson

[11] Patent Number: 5,621,669
[45] Date of Patent: Apr. 15, 1997

[54] MOISTURE SENSOR PROBE AND CONTROL MECHANISM

[76] Inventor: Eyjolf S. Bjornsson, P.O. Box 512, Placerville, Calif. 95667

[21] Appl. No.: 194,611

[22] Filed: Feb. 10, 1994

Related U.S. Application Data

[63] Continuation-in-part of Ser. No. 32,159, Mar. 12, 1993, abandoned, which is a continuation of Ser. No. 558,424, Jul. 27, 1990, abandoned.

[51] Int. Cl.⁶ .................................................. A01G 25/16
[52] U.S. Cl. ..................... 364/571.01; 364/483; 364/482; 239/70; 239/63
[58] Field of Search .............................. 364/483, 571.01, 364/482; 324/57 R, 59; 239/64, 70; 327/157

[56] References Cited

U.S. PATENT DOCUMENTS

| 4,408,282 | 10/1983 | Hof | 364/482 |
| 5,207,380 | 5/1993 | Harryman | 239/64 OR |
| 5,337,957 | 8/1994 | Olson | 239/63 |

Primary Examiner—Emanuel T. Voeltz
Assistant Examiner—Kamini Shah
Attorney, Agent, or Firm—Howard L. Rose

[57] ABSTRACT

A sensor probe for moisture and other properties of bulk materials contains selection, input, excitation, and isolation functions for obtaining signals from a group of sensors, converting the signals to digital information, correlating portions of the information and transmitting the information to one or more external actuators and remote receivers and controllers.

10 Claims, 10 Drawing Sheets

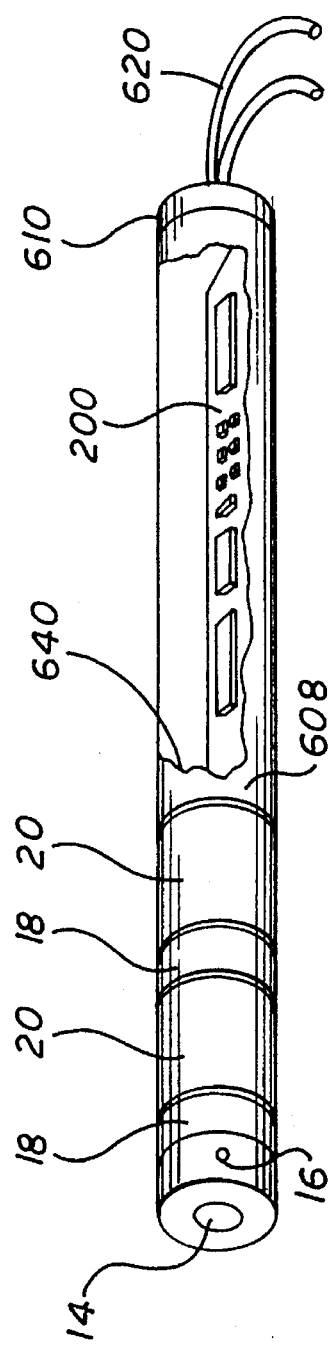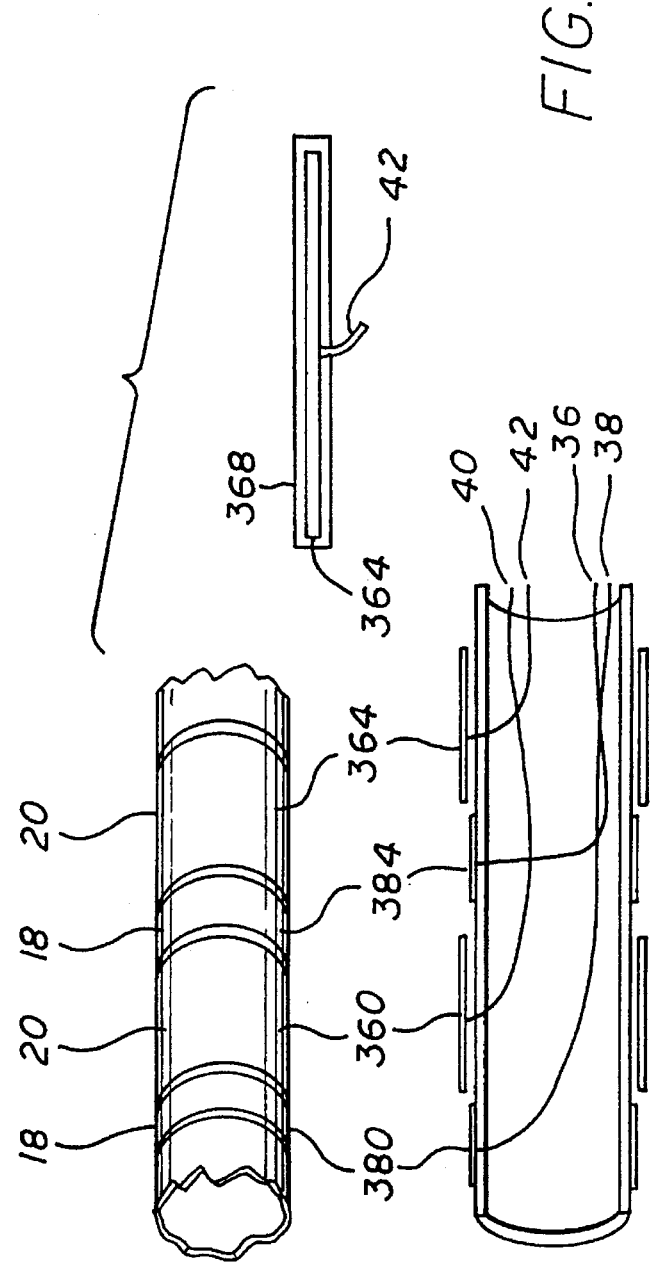

MOISTURE SENSOR PROBE AND CONTROL MECHANISM

RELATED APPLICATIONS

This application is a continuation-in-part of Ser. No. 08/032,159 filed Mar. 12, 1993, now abandonded which was a file-wrapper continuation of Ser. No. 07/558,424 filed Jul. 27, 1990 (now abandoned).

FIELD OF THE INVENTION

This invention relates to improved designs for accurate measurement and transmission of data and control actions responsive to bulk material characteristics and behavior including conductivity, pH, temperature and especially moisture content. The invention is useful for monitoring quality and change in any bulk medium, particularly including agricultural, horticultural and natural soils. A typical use is for the control of irrigation, watering, and fertilizing equipment in landscaping and agriculture.

BACKGROUND OF THE INVENTION

The present invention is directed to an apparatus for precisely capturing measurements from remote and inaccessible locations and transferring that information in an enhanced and highly accurate representation to monitoring, recording and especially controlling devices which may be physically distant from the sensors.

The invention particularly applies to the measurement of moisture in the soil, in earthworks, in cement castings, and in other bulk materials, whether solid or fluid, of homogeneous or heterogeneous constitution, however varying in composition, shape, particle distribution, compaction, saturation, temperature, and chemical nature. Along with or alternate to the measurement of moisture, the invention may be applied to measuring temperature, pH, conductivity and other physical qualities of bulk media. The invention is particularly well suited to application where sensors and the sensor probe must function reliably and unattended for long periods of time. The sensor probe also incorporates refinements applicable to the gamut of practical measurement applications where accuracy, reliability, safety and flexibility of installation are important.

Control of irrigation systems is important for many reasons, especially to conserve resources such as water and fertilizer and to assure the optimal growth habit of irrigated vegetation.

The term "irrigation systems" as used here includes the entire range of horticultural applications from domestic lawn sprinklers to drip and mist systems to irrigation canals and moving structure sprinklers for agricultural production, plus other variants and applications not mentioned which will be readily evident to persons skilled in the art. Systems which deliver nutrients, pesticides, growth hormones and other stimulants, supplements, and inhibitors to plants are included in this scope of definition.

Among the many resources whose use may be optimized by improved control of irrigation systems are: water supplies, electrical energy for pumping and distributing water, fertilizing chemicals and management and cultivation labor.

Valuable qualities of agricultural, horticultural, and landscaping soils which may be preserved or conserved through skillful control of irrigation systems are soil aeration and consistency, naturally occurring mineral reserves, and embedded reserves of organic and inorganic amendments.

In addition to the cost of water itself, the use of water typically causes collateral costs of other valuable resources such as electricity for pumping and energy and materials for pre and post-use purification and transport.

Irrigation systems commonly in use today are subject to frequent and often incorrect manual adjustments to improve the results obtainable from timer-type open-loop controls. A special goal of this invention is to offer an alternative to this wasteful and sometimes counterproductive use of human labor by providing an effective and practical mechanism for using closed-loop control methods in the practice of irrigation.

An ideal irrigation process provides just the right amount of moisture to living plants under all variations of season, temperature, wind, topography, plant habit and other conditions affecting survival and growth of flora.

The invention which is subject of this disclosure materially advances the art with regard to the precision, convenience, and reliability of means for controlling the irrigation of living plants by measuring soil moisture and the related soil characteristics of pH, soluble mineral content, and soil temperature.

Irrigation systems and the plants they service may operate in an open loop or closed loop control process. In an open loop process, control actions are taken without respect to the actual conditions or circumstances of the controlled element. Clock timers which operate irrigation valves to water plants at preset fixed intervals are an example of an open loop process. These require continuous management and manual interaction to provide a suitable result without waste.

Because open loop processes are not responsive to the environment or even to the results of their control actions, they are inherently unable to adapt to changing requirements except by the approximation of a fixed prearranged scenario of changes.

Open loop control processes are usually either off or on, since the lack of feedback information to regulate controls makes subtlety in output modulation largely irrelevant.

Where an open loop process is used to control a naturally changing phenomenon, such as the varying cycle of water demand experienced by growing plants as the seasons pass from Spring to Summer to Fall to Winter, the control process must, to avoid catastrophic failure in its mission, be set to allow for the "worst" or most extreme case which can be anticipated.

For irrigation systems this extreme case is the maximum water supply required to keep plants healthy on the hottest summer day in a blast of desiccating wind. On such a maximum day, if not provided with replenishing moisture, the plants may wither and die, drop fruit, or experience reduced vigor and yield.

One can readily see that on all days when actual water demand is less than the worst-case extreme one, a fixed program control which waters on the basis of worst case plant requirements will apply excess water.

The addition of a measurement method for soil moisture monitoring and its combination with a closed loop control process, as disclosed here, provides a greatly improved reliable means for effective feedback control of irrigation.

OBJECTS OF THE INVENTION

An object of this invention is to provide improved means for obtaining information pertaining to the moisture, salt content, temperature and chemical activity of a bulk medium such as soil.

Another object is to incorporate means both for measuring and for transmitting the resulting data with maximum precision, fidelity, and reliability, even when the device is located in hard to access places and adverse environments such as beneath the surface of the soil in irrigated landscaping or in farming plots.

The principal object of the disclosed invention is to provide a means for precise measurement of moisture within the soil and a mechanism for reliably transferring that information to remotely situated irrigation controllers and actuators.

Still another object is to provide a sensor probe design that permits it to be packaged in a durable enclosure suited for burial or insertion into the soil. The combination of sensors with the package simplifies installation and assures consistency of measurements from site to site in practical use. Incorporating the sensing and excitation electronics in the package in close proximity to the sensors maximizes accuracy and minimizes noise artifacts which can otherwise distort or completely override the low-level signals from the sensors.

A further object of the invention is to provide for reliable unidirectional and bidirectional communication between the sensor probe and external controllers and actuators which can operate over substandard, poorly insulated, resistive, and noisy electrical wiring such as are often found in agricultural and landscaping applications as the result of deterioration of buried wiring over time.

A further object is for the sensor probe to operate on demand or continuously in real-time to suit the needs of a variety of control and data collection uses.

A further object is for the sensor probe to be adaptable to configuration and manufacture for a wide range of applications, environments, and uses.

A further object is for configuration and design of the sensors to be simple, reliable, easy to manufacture, readily adapted to the wide range of soil types and ambient moisture levels which are of interest in practical applications.

It is another object that the sensor probe be adaptable to a plurality and diversity of sensors and methods or media for transmission of obtained data to controlling and receiving devices. These and other variabilities are incorporated within the scope of the invention by including appropriate adaptive means within the described functional elements.

BRIEF DESCRIPTION OF THE PRESENT INVENTION

An aim of the invention is to provide the highest quality of result in practical measurement applications involving soils and other bulk materials. Metrics of quality in this regard include low cost, high precision, insensitivity to interference and damage from environmental factors, stability and consistency of calibration, adaptability to various modes of power source including batteries, local and remote low-frequency alternating current and direct current electrical power, or optical power.

The construction of the moisture and conductivity sensors on a rigid nonconducting cylinder contributes to their physical stability and continuing accuracy for long use under environmentally harsh conditions.

The use of multiple sensor types with cross correlation of readings using internally stored tables gives higher accuracy than from a single sensor. In addition to soil moisture, additional sensors can provide valuable measurement information regarding ion content, temperature and pH to the operator.

Dynamic recalibration of the measurement references with each measurement cycle corrects for naturally occurring variations due to temperature variations and component aging.

Provision for various power sources and modes of powering give further flexibility in installation. The line interface circuit multiplexes power and bi-directional signaling in a manner which permits full galvanic isolation of the sensor probe and its very low voltage responsive sensors. The line interface circuit also provides a two-wire connection that is tolerant of poor wiring quality and high induced noise voltages while allowing binary protocol signalling to and from the remote and/or buried probe.

The provision for optical output for moisture, conductivity, temperature and pH readings from the sensor probe allows reliable and electrically isolated long-distance transfer of information to one or more controllers and reading devices, including data transfer to portable data capture devices used in proximity to the sensor probe at an above ground connection to the optical path.

The use of a separate output path for direct control of actuation devices from the sensor probe, without reference to an external controller, gives additional flexibility for installation and use. The unique protocol disclosed herein transmits sensor probe measurement values and actuation codes in time domain analog form to actuating devices so that each device may locally incorporate a threshold adjustment control for determination of the measurement level at which it may operate. Any number of devices may thus be attached to and driven from the same signal source, each with its own response pattern to the measured data. Furthermore, using this protocol, the sensor probe may be programmed to override the normal actuation response of all the connected actuators by substituting for the true measurement value an artificial maximum value to force all controls to one extreme, or an artificial minimum value to force the other extreme.

The disclosed measurement methods provide a dynamic range of more than four orders of magnitude for moisture and conductivity measurement as disclosed in the preferred embodiment, and a range greater than six orders of magnitude with alternate embodiments as described. Because of the wide variability of soils and growing conditions, this wide range is useful in practice.

The use of multiple sensor types permits cross correlation and correction of moisture readings for temperature and conductivity values which are common sources of error in the prior art.

The use of table driven calibrations permits further refinement in the calibration of individual units, so that the sensor probe is useful for research measurement purposes as well as irrigation controls and similar uses.

The sensor probe power system permits connection of galvanic isolation devices between the wiring and the line connections of the sensor probe. A typical such device would be a high frequency transformer-isolated switching power converter, attached near the sensor probe.

When a galvanic isolation device is used, the sensor probe line circuit on the non-probe side of the isolator may be grounded on one side, may be a single conductor and earth ground, or may be shared with other low-voltage wiring circuits such as those for actuators and other controls.

As disclosed, the line connection is protected from short or long term polarity reversal of the supply voltage and from high voltage surges on the line. The line connection is operable from either direct or alternating current.

The line connection provides for digital output signals from the sensor probe to the external controller to be transmitted by current modulation of the power supplied over the line connections.

The line connection provides for digital input signals to the sensor probe from the external controller to be transmitted by amplitude modulation of the voltage supplied to the sensor probe over the line connections. By modulating the voltage supply, whether DC or AC, to voltage levels over and above the level required by the sensor probe voltage regulator maintaining a stable output, digital signals are reliably superimposed on the supply line in a manner which permits reception by simple threshold decoding at the receiving end.

The sensor probe has a second optional, 2-way communication path with conventional digital signal levels which provides a separate copy of the measurement data in a readily usable form.

The sensor probe to external controller protocol allows the controller to initiate measurements on demand by making the line sense input active during idle conditions. Otherwise, the sensor probe transmits information periodically at timed intervals with very low power consumption between intervals.

The use of an internal battery and alternate paths for power supply provide flexibility in connection and operation. Power conservation controls in the electronics can further minimize battery or supply draw. Regulation of input power and supply-independent referencing of the comparison circuit, combined with dynamic recalibration during each measurement cycle permits the use of varying and unreliable power sources such as turbines and solar cells with minimal effect on the sensitive measurement process.

The design of the sensor attachment circuitry readily permits increasing or decreasing the number of sensors without significant cost or change to the design.

The programmable nature of the probe controller permits addition of new sequences and functions to the probe at little or not cost.

The internal expansion connector with provision of spare input/output signals permits economical attachment of additional memory and timing devices and provision for additional input-output functions without the need for modifying the device architecture.

The use of EEPROM memory for calibration tables permits custom calibration of each device or category of device, and field recalibration of sensor probe devices without opening and unsealing.

The sensors may be fabricated directly onto the outer housing of the sensor probe electronics, or may be fabricated onto a separate housing and then joined to the electronics assembly by connector.

The design and working characteristics of the sensors may be readily adjusted during manufacturing by the use of larger and smaller surface areas, spacing distances, and coating thicknesses to suit varying requirements for sensitivity, range, and durability.

Various materials may be used for the conductive surfaces of the conductivity and moisture sensors to achieve different measuring and manufacturing goals. Appropriate materials include non-reacting metals such as gold and stainless steel, conductive polymers, and reactive metals and other conductors.

The number of moisture and conductivity sensors in a single probe assembly may readily be increased, so as to permit concurrent multi-depth measurement of these parameters by a single assembly.

The invention greatly improves the quality of result and reduces the cost of accurately measuring moisture in soils for the purpose of irrigation control. By providing appropriate information regarding soil moisture in understandable and actionable form at the location where automatic or human-assisted operational decisions are made, the invention promotes very responsive and resource efficient control of the irrigation process despite major variabilities in climate, season, weather and plant requirements.

The invention incorporates novel means for exciting and obtaining information from a variety of sensors which may operate singly, interchangeably, or in combination to originate diverse and useful measurement values.

Multiple sensors of multiple types may concurrently operate on a single probe so as to better characterize and indicate the environmental conditions for which control response may be required.

The instant invention consists of one or more sensors, incorporated in or attaching to a probe which contains sensor input and data output and power and control isolation functions, an input selecting function, electronic and/or optical circuitry for sensor excitation, input signal amplification, signal processing, analog to digital conversion, digital value processing, output signal modulation, line transmission, power supply and output isolation. The operation of the sensor probe is controlled by a master sequencing unit or probe controller which switches the individual working elements into or out of action according to a schedule, an external command, or a result derived from the measurement data itself. The sequencer may serve various additional functions: to conserve energy, to reconfigure for different tests or to sequentially or concurrently select among different sensors. The sequencer may also provide selection among various probe assemblies on a given main connection path, or to select among alternate or redundant main connection paths to the remote controlling system. The sequencer may initiate control actions to external actuators and may, itself, be responsive to control inputs.

The disclosed invention consists of a sensor probe assembly which collects measurement signals sensed from one or more sensors, processes the signals, generates control output signals responsive to the sensor measurements, and selectively or continuously conveys the information resulting from the measurement process by means of a transmission path to an external coordination and control unit which operates control means that vary the environment monitored by the sensors, especially with regard to the moisture and ion content of soils, and the application rate of fertilizers, chemical amendments and irrigation fluids.

The improved sensor probe especially represents an advancement in the art of measurement of subsurface soil moisture, mineral and ion content. Use of the full complement of sensors described herein is well suited to improvement of results in research applications where data collection and control capabilities are desired. In commercial irrigation applications, sub-portions of the designs disclosed here may be adequate and suitable for some specific uses.

Despite the broad range of function, diversity of application, and precision and reliability of operation manifest in this invention, it may, in practice, be packaged in a compact and inexpensive form applicable to efficient agricultural production of food and the artful maintenance of landscapes.

The focus of this invention is the precise capture and accurate preservation of source information obtained in a remote and inaccessible location which is then forwarded to a control mechanism more advantageously situated. The invention may also initiate control actions on its own initiative based on the relationship of measurement data to pre-programmed threshold values.

A feature of this invention is its adaptation in form and function to the practical constraints of measuring and processing low-level information signals in uncontrolled physical environments. The probe is be constructed so as to be compatible with a background of various interfering natural phenomena, including the electrical, thermal, magnetic and chemical effects which commonly affect underground sensors connected to signal paths perhaps thousands of feet long over unshielded wiring.

The manner of electrical connection of the sensor probe permits simultaneous or sequential connect to more than one remote control or monitoring path. An optical data output path is also provided for communication via lightguide, infrared, or fiber optic means. Multiple output capability improves the economy and applicability of the probe in remote control, redundant or fail-safe, and distributed control or networked applications.

A further benefit of the invention is that the shape and dimensional scale of the probe are particularly compatible with simple installation in the soil, and with equally simple removal. The sensor probe can be installed permanently or installed and removed on a seasonal or occasional schedule with minimum effort and cost.

A particular benefit of the sensor probe design is that it permits the probe containing the sensors to operate in a continuous physical relationship to the adjacent soil mass. The dislocation and disruption of a soil mass that is caused by installing the sensor assembly, combined with the natural effects of settling and compaction of soil around the sensor, may cause changes in the soil compaction and therefore in the measurement values initially obtained at a new installation for a given level of actual soil moisture.

With a permanently installable measuring device like the sensor probe, soil moisture measurement values will gradually stabilize after installation and thereafter will remain relatively constant for the service life of the installation, giving far better accuracy in readings than available from temporary hand-inserted survey sensors which measure immediately after displacing the soil.

A further benefit of the invention is that it can automatically self-calibrate during operation. It is thereby able to be more accurate for a longer duration than previous designs. This is made possible by the use of multiple sensors, by the incorporation of internal precision references for calibration, and by the proximity of the sensors to the signal processing and data acquisition electronics. It helps that the sensors are locally controlled for both calibration and normal operation by the probe sequencer.

A further benefit of this invention is that it supports operation of multiple soil sensor types and modes of operation from a single probe unit. The practical value of incorporating plural sensors in a single sensor probe is to obtain additional information from the measurement site. Having multiple similar sensors allows checking one against the other for reliability, and having several kinds of sensor makes it possible to obtain data values for various physical phenomena at the measurement location which can be cross-correlated to provide more precise and more meaningful results.

As an example, soil moisture, ionic mineral content, and temperature have a complex and interrelated effect on the electrical conductivity of the soil matrix. By contemporaneously measuring each of these three parameters, and then calculating the interaction between them, more accurate and therefore more repeatable values are obtained for the moisture readings.

The conductivity, temperature, pH and soil moisture sensors in the sensor probe work in a symbiotic manner to provide more meaningful information about soil behavior.

The primary moisture sensor indirectly measures the moisture content of the soil by capacitively coupling energy into the soil medium, and then sensing the efficiency of electrical transfer of the coupled energy through the soil.

Under most circumstances, very dry soil acts as an electrically non-conducting or insulating medium of considerable molecular mass. When dry, soil will serve as the dielectric element separating the plates of a capacitor.

The addition of even small quantities of moisture causes extensive diffusion of water molecules into the soil volume. Then the electrical conductivity of the soil increases due to moisture induced disassociation of positive and negative mineral ions which support electrical conduction paths between, within, and upon the surface of soil particles. Temperature and the extent of soluble minerals in the soil combine with the inherent variability of soil properties to make the relationship between increasing soil moisture and conductivity inherently complex.

Further increase of moisture has the effect of increasing the electrical conductivity of the soil medium to the extent that dielectric effects are increasingly localized to the vicinity of the surface of the sensor, while conductive effects of the bulk medium increase in proportion to the moisture content. At a high level of moisture, the conductivity of the soil mass reaches a threshold where the capacitively sensed soil characteristic no longer varies significantly with additional moisture.

The ion content sensor measures the electrical conductivity of the soil directly by contacting the soil mass with two conductive electrodes which complete a direct-current path that is measured by the probe. Conductivity is the reciprocal of resistance. The direction of the measuring current is reversed automatically during operation to control polarization of the soil and limit electrolytic damage to the sensor contact electrodes.

Certain soil types bond aggressively at the molecular level to water ions, causing irregularities in the relationship between moisture content and internal electrical conductivity of the soil mass. Similarly, variations in the presence and quantity of ionizable salts in the soil can greatly influence the relationship between soil moisture and the bulk conductivity of the soil. At high concentrations of soil moisture, the conductivity sensor provides a reference for ionic activity in the soil medium which can be used, in real time or subsequently, to correct measurements from other sensors taken at lower moisture levels. Such correction extends the working range of a given sensor, permits more accurate sensing of low-level changes, and aids the prediction of trends.

The conductivity measure is sometimes used, by itself, for measuring moisture content in soils. When used as a source of correction values for the capacitive impedance type moisture sensor, conductivity measurements contribute to higher accuracy from the capacitively coupled sensor. The conductivity sensor values provide additional useful moisture measurement information at the wet end of the measurement range where capacitive methods lose sensitivity and resolution.

Ion content conductivity measurement information is especially useful in irrigation practice, because ion content is proportional to soil salinity, which tends to naturally increase in many irrigated soils as the result of deposits left by evaporating moisture. Sometimes, water conservation oriented irrigation practices exacerbate the salinization of soils.

Salinity above a certain threshold is inimical to plant growth. When excess salinity is found to exist, extra large irrigation flows are necessary to wash out the mineral salts, requiring a marked change in method from normal conservation technique.

BRIEF DESCRIPTION OF THE DRAWINGS

FIG. 7 shows a cutaway view of an embodiment of the probe and sensors combined in a single package with waterproof seals;

FIG. 9 shows a detail of sensors 16, 18, and 20;

DETAILED DESCRIPTION OF THE PRESENT INVENTION

Figure 1:
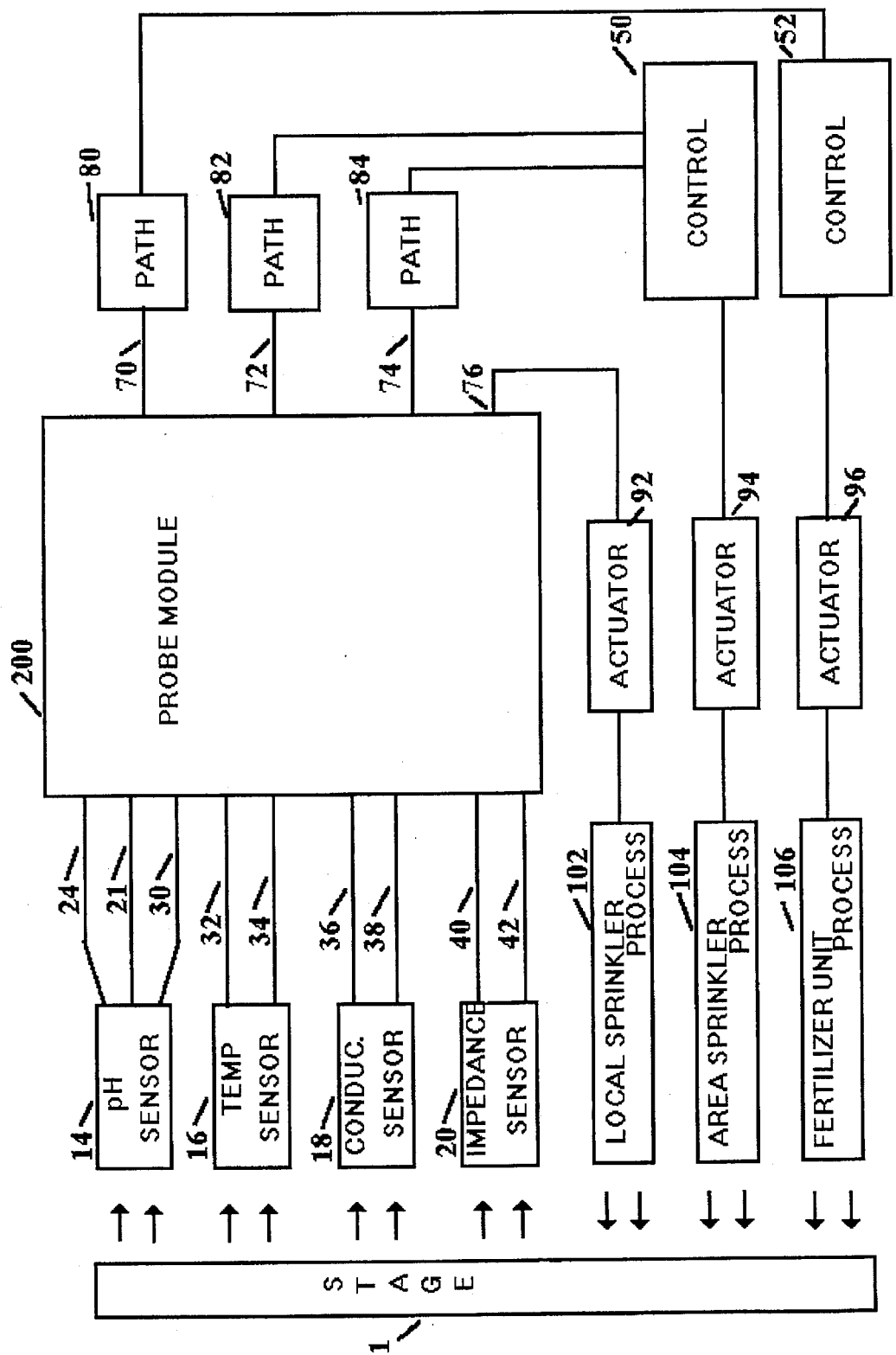
FIG. 1 shows the invention in its preferred use with a closed-loop control system and with a directly controlled actuator.

FIG. 1 shows the overall framework in which the invention operates. Sensors 14, 16, 18, and 20 sense the condition of Stage 1 which is the medium, such as a plot of earth or other granular or bulk material, being measured and controlled by the sensor probe assembly 200 and connected elements.

Figure 5:
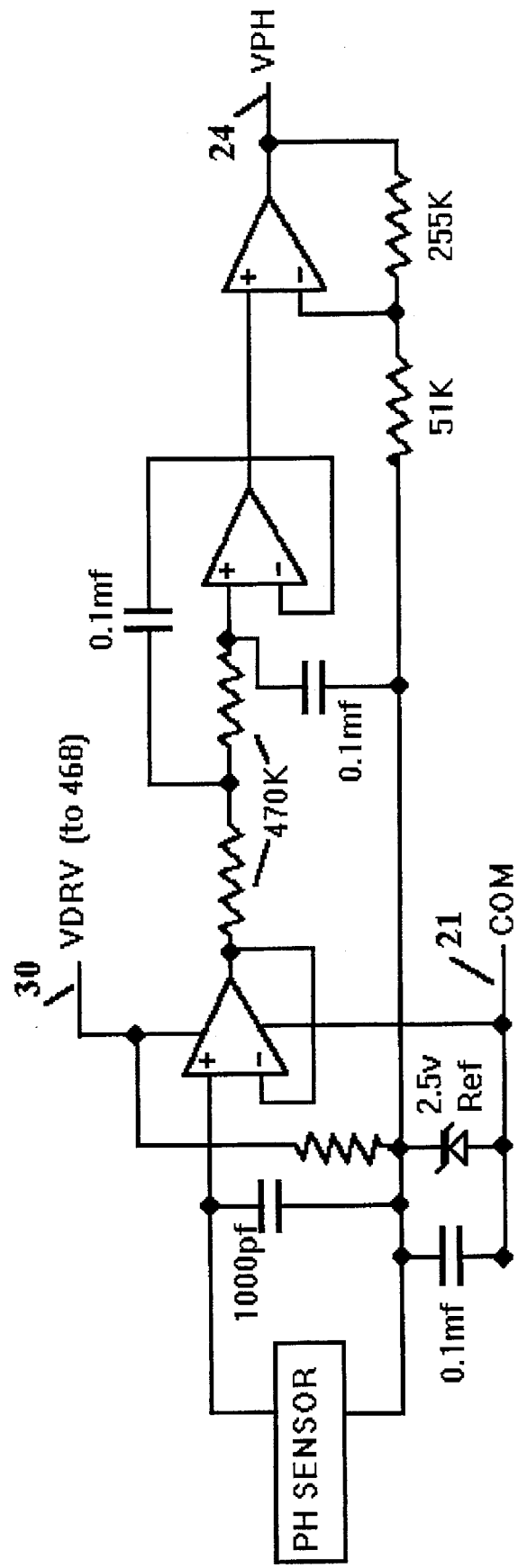
FIG. 5 shows a detail of the pH probe and preamplifier.

Sensor 14 is a conventional combination electrode pH probe, situated so as to be in contact with the stage 1 medium. In the preferred embodiment, the pH probe includes a field effect transistor integrated circuit amplifier for converting the high impedance and low signal voltage level characteristic of this type of pH probe to a low impedance amplified DC signal which connects to the sensor probe, as shown in FIG. 5. Sensor 14 communicates with probe module 200 over a 3-wire connecting interface including COMMON 21, path 24 for signal, and path 30 for power to the sensor. Sensor 14 may itself be separate from the sensor probe housing, connected by appropriate wiring or may be physically contained within the sensor probe housing 608, as shown in FIG. 7.

Sensor 16 is temperature sensor, consisting of a negative temperature coefficient thermistor with a value of about 20K ohms at 10 degrees Celsius, which is excited and sensed by the probe module 200 over connections 32 and 34.

Sensor 18 is a conductivity sensor, consisting in the preferred embodiment of conductive electrode surfaces 380 and 384 (see also FIGS. 4, 7 and 9), electrically isolated from each other on housing 608 by a measured spacing distance 386 and situated in intimate contact with the stage 1 medium. Conductors 36 and 38 attach the electrodes to probe module 200.

Sensor 20 is a capacitive impedance sensor, consisting in the preferred embodiment of conductive electrode surfaces 360 and 364 (see also FIGS. 4, 7 and 9), these surfaces being electrically isolated from each other by a calibrated spacing distance 366 and from the stage 1 medium by a moisture excluding electrical insulating surface coating 368, through which the electrode surfaces are situated in intimate but electrically isolated contact with the stage 1 medium. Conductors 40 and 42 attach these electrodes to probe module 200.

The probe module 200 sequences and manages operation of the sensors 14, 16, 18, and 20, supplies power and excitation appropriate to each sensor's function, processes and converts each sensor's output signal into a superior form and then communicates signal and optionally status information via connections 70, 72, 74 to paths 82, 84, 86, and 88, which may be electronic, optical, magnetic, mechanical or otherwise functioning, and which may be plural, redundant, or singular, real-time or delayed, or both, to independent controllers 50 and 52, operating actuators 94 and 96 to initiate or inhibit processes 104 and 106. Probe module 200 may concurrently connect via the multiple paths 80, 82, and 84 to multiple independent controllers 50, 52 which are functionally or physically separate and distinct. Probe module 200 also controls actuator 92 via connection 76 to directly control process 102 without involvement of an external controller.

The independent controllers 50 and 52 are responsive to signals from the probe plus stored conditions and structure inherent or programmed into the controller. The controllers in specific cases may be as simple as a semiconductor switching element or as complex as a distributed array of real-time computers. The function of the controllers is to communicate with the sensor probe as necessary to obtain information, and based on the information to properly operate one or more actuators 94, 96, etc., which in turn allow or inhibit or otherwise modulate processes 104 and 106 to modify the condition or environment of the Stage 1, which modification is in turn sensed by sensors 14, 16, 18, and 20. Process 102 is similarly controlled through actuator 92 by the sensor probe itself acting as a controller. The result is a closed loop feedback-controlled process management system with diverse paths and functional capabilities.

Figure 2:
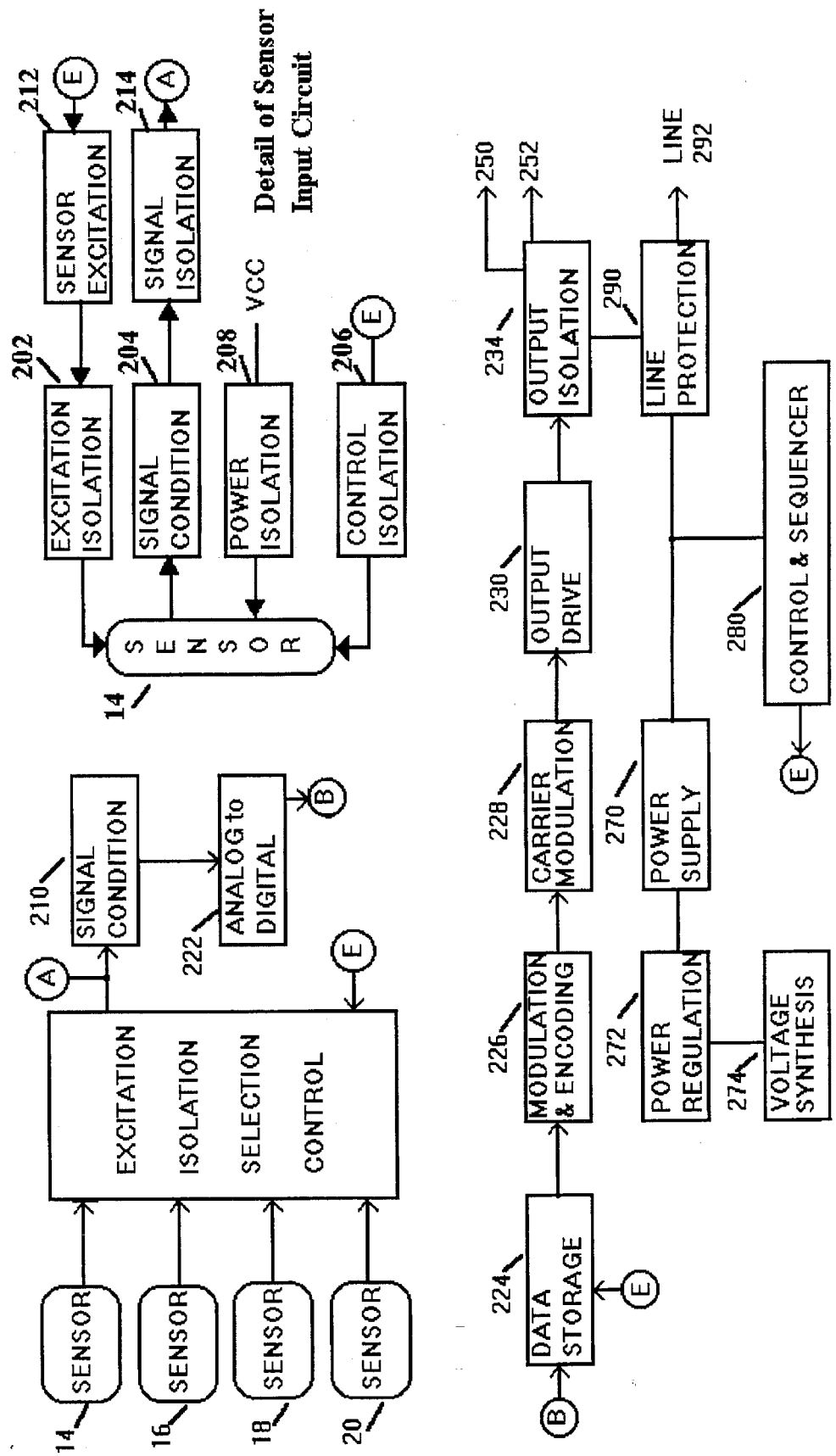
FIG. 2 shows a detail of the probe 200 from FIG. 1.

FIG. 2 shows a block diagram of the probe module 200 and its functional elements. Sensors 14, 16, 18 and 20 each connect individually to input selector stage 214 and sensor excitation stage 212, either directly or, in an alternate embodiment through galvanic isolation stages, for excitation isolation stage 202, input signal isolation stage 204, power supply isolation stage 206 and control isolation stage 208. Signal conditioner 210 amplifies the selected sensor signal for input to analog to digital conversion stage 222. Converted data is stored in memory 224 until control & sequencer 280 schedules it for transmission via signal modulation & encoding stage 226, carrier modulation stage 228, output drive stage 230 and output signal isolation stage 234, which transmits over control output paths 250 (electrical) and 252 (optical) and via the probe line power interface 292.

Figure 3:
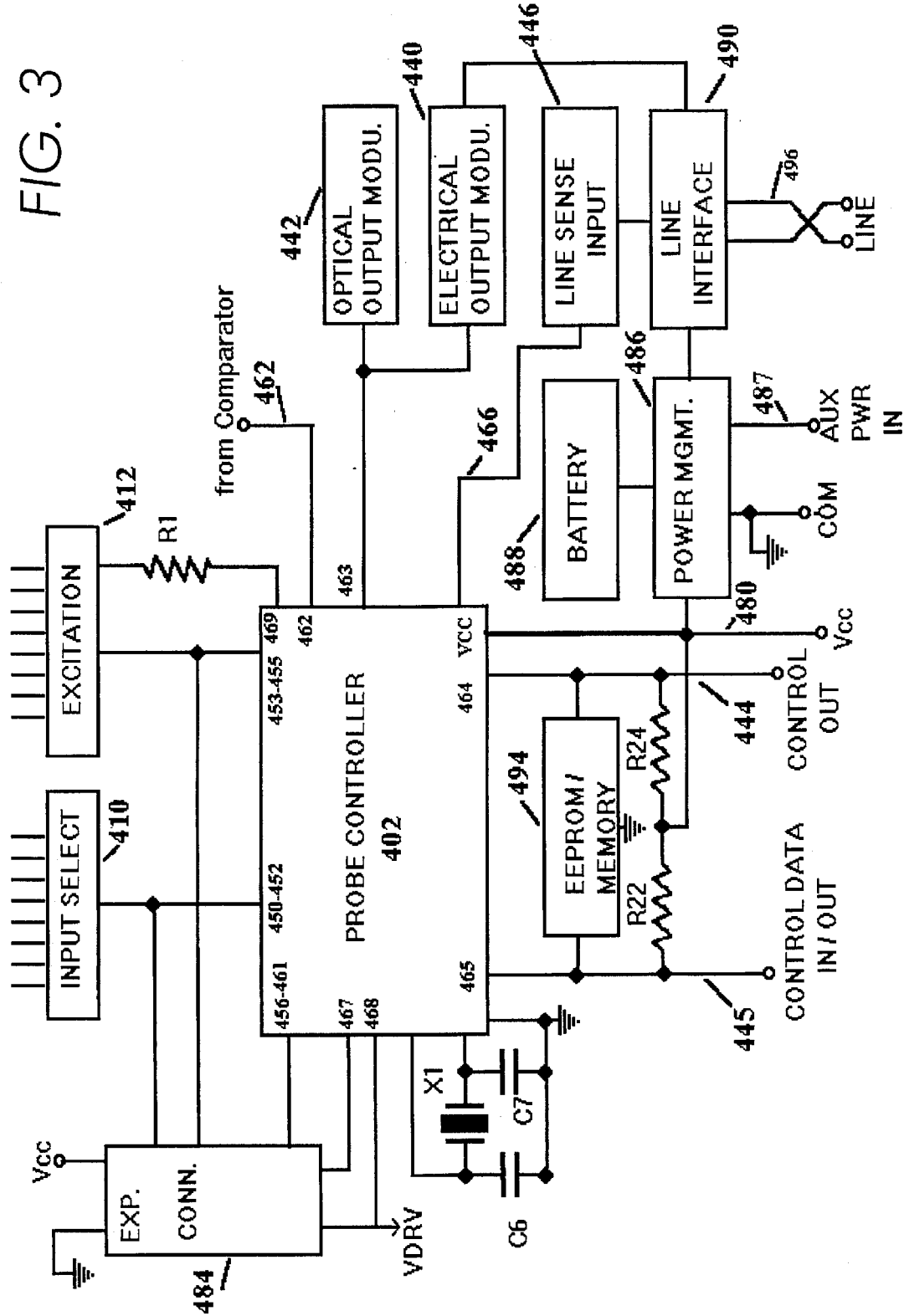
FIG. 3 shows probe controller 402 signal connections.

FIG. 3 shows a diagram of the probe module 200 with a detail of the probe controller 402 signals and interface connections. Probe controller 402 performs the functions of stages 210, 222, 224, 226, and 228 as shown on FIG. 3, as well as other functions.

Probe controller 402 derives its internal timing reference from crystal X1, the value of which may range from 30 KHZ or less to many MHZ at the discretion of the user, balanced by 15 picofarad resonating capacitors C6 and C7.

Power is supplied to the probe controller from power management circuit 490 through VCC and Common connections. The nominal internal supply voltage is 5 volts, D.C.

All of the remaining signals of the probe controller are used for input-output functions. Except where otherwise indicated, each of the input-output signals is dynamically programmable to be an input, which is a high-impedance "open" circuit to other elements connected to the signal path, or an output, which is a low-impedance-driven signal which either sources current from the VCC supply in the "high" state or sinks it to COMMON in the "low" state.

Figure 4:
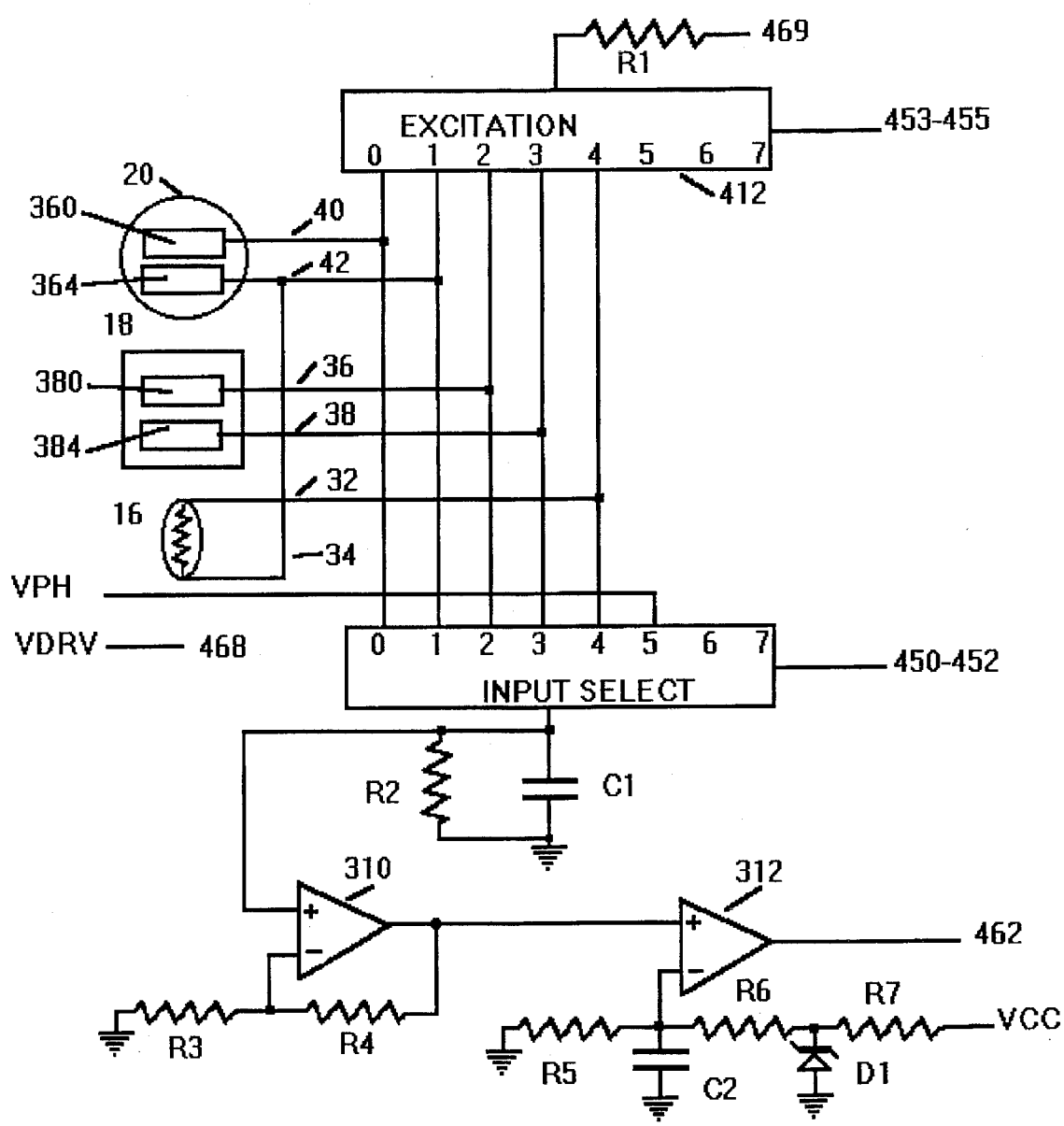
FIG. 4 shows a detail of the sensor input circuits and digitizing interface.

FIGS. 3 and 4 show details of the input circuits. Probe controller 402 operates three programmable signals 450, 451, and 452 to the address inputs of channel input selector 410, three programmable signals 453, 454, and 455 to the address inputs of channel excitation selector 412. Selectors 410 and 412 are each 1-of-n CMOS "transfer gate" selectors with encoded selection inputs, such as the generic and commonly available type 4051 CMOS multiplexer integrated circuit. This type of device offers a high impedance to all unselected inputs, while providing a low resistance bi-directional direct current path between the multiplex output terminal and the input selected by the binary coded address input.

Probe controller 402 senses the level of comparator 312 output by means of input signal 462.

Probe controller 402 drives electrical output modulator 440 and optical output modulator 442 with optical signal path 443 from output signal 463.

Probe controller 402 senses the input from line sense input 446 by means of input signal 466.

Probe controller 402 senses the signal from control data input 445 by means of input signal 465. This bi-directional line may also be used for control output. Probe controller 402 senses and drives control output circuit 444 from signal 464.

Electrically Erasable Programmable Read-Only Memory (EEPROM) 494 signals SCL and SDA connect to I/O lines 464 and 465, respectively. Resistances R22 and R24, typically 5.6K ohms each, pull up these lines to VCC. EEPROM 494 is type 24C02, with a memory capacity of 2048 bits in the preferred embodiment, which can be increased to 16384 bits or more by substitution of higher density parts with the same connections. Several sources, including National Semiconductor, Inc. and Xicor, Inc. supply compatible parts of this type.

As shown, some of the probe controller input-output signals are also connected to a 16-pin socket 484 which serves as an expansion connector for attachment of additional memory devices and interfaces as packageinternal options to the sensor probe:

| Signal | Pin number | |
| --- | --- | --- |
| 450 | 1 | Input-Output |
| 451 | 2 | Input-Output |
| 452 | 3 | Input-Output |
| 453 | 4 | Input-Output |
| 454 | 5 | Input-Output |
| 455 | 6 | Input-Output |
| 456 | 7 | Input-Output |
| COMMON | 8 | Power & Signal |
| 457 | 9 | Input-Output |
| 458 | 10 | Input-Output |
| 459 | 11 | Input-Output |
| 460 | 12 | Input-Output |
| 461 | 13 | Input-Output |
| 467 | 14 | Input-Output |
| 468 | 15 | Input-Output |
| V + DC | 16 | Power |

FIG. 4 shows a detail of the sensor input circuits shown in FIGS. 1, 2, and 3.

Power circuit VCC and Common are supplied to the integrated circuits in the conventional manner.

Moisture sensor 20 connects via leads 40 and 42 to excitation selector 412 and input selector 410.

Conductivity sensor 18 connects via leads 36 and 38 to excitation selector 412 and input selector 410.

Temperature sensor 16 connects via lead 32 to input selector 410 and via lead 34 to moisture sensor lead 42, which it shares.

Excitation selector 412 is addressed by signals 454, 454 and 455. The common multiplex terminal of excitation selector 412 connects to reference resistance R1, which connects to transfer gate signal 469.

Input selector 410 is addressed by signals 450, 451 and 452. The common multiplex terminal of Input selector 410 connects to reference capacitor C1, to reference load resistance R2, and to the non-inverting input of operational amplifier 310. Op amp 310 and resistors R3 and R4 form a 3 X gain stage for increased sensitivity in comparator stage 312, whose reference level is set at 0.25 V by the voltage divider R5 and R6 connecting to zener reference D1 which is supplied through current limiting resistor R7 from the VCC supply. Component values are generally non critical because most measurement errors are removed by dynamic calibration of the interface during operation. LM358 is one of many integrated circuit op-amp component types suitable for 310 and 312.

FIG. 5 shows the pH probe preamplifier and connection interface. A standard combination-electrode pH probe connects to a unity-gain FET operational amplifier working as isolation stage, followed by a low-pass filter and 5X gain stage which drives the output. DC power is supplied to the preamplifier by probe controller signal 468.

Figure 6:
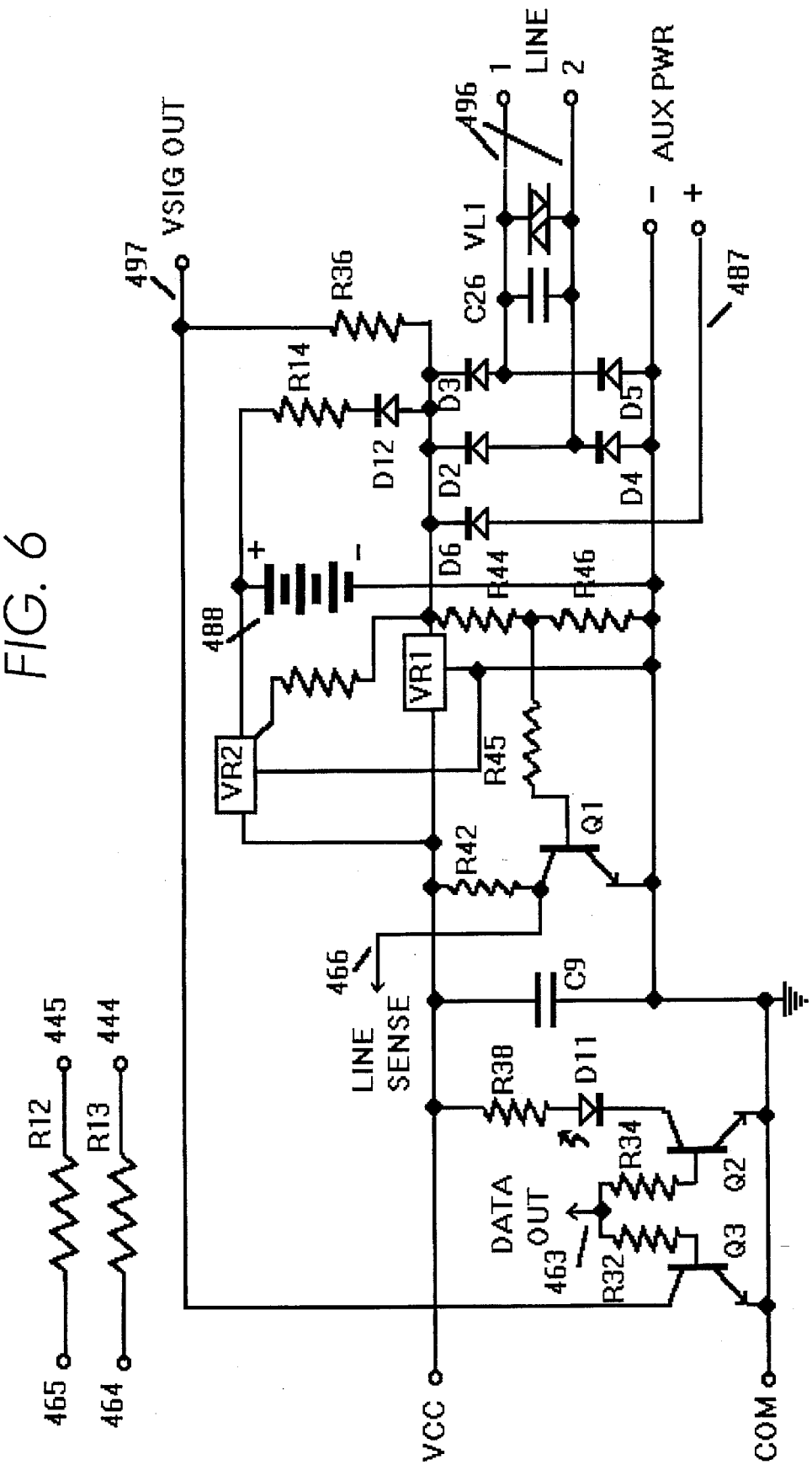
FIG. 6 shows a detail of the control interface input/output and power circuits.

FIG. 6 shows a detail of the control interface input/output and power circuits from FIG. 3. Line interface signals LINE1 and LINE2 are rectified by a bridge comprised of diodes D2–D5. The unfiltered rectified power charges battery 488 via resistor R14. When input power is removed from 5 volt regulator VR1, battery 488 discharges via regulator VR2 into the regulated power line. A voltage divider from unregulated DC to common drives the base of line input sense transistor Q1, producing signal 466. Transistors Q2 and Q3 are output drivers from line output signal 463. Q3 switches output signal 497, while Q2 modulates optoelectronic device D11 to generate optical output signals. Control data interface signals 465 and 464 are in series with protective current limiting resistors R12 and R13.

| FIG. 6 Component Values | |
|---|---|
| D2–D6 | 1N4001 or equiv |
| D11 | AND180CRP or equiv |
| Q1–Q3 | 2N2222 or equiv |
| VR1,VR2 | TL75LP05Q or equiv |
| C9 | 10 mf |
| C26 | 220 pf |
| R12 | 200 ohms |
| R13 | 200 ohms |
| R14 | 1.3K ohms |
| R32 | 2.2K ohms |
| R34 | 2.2K ohms |
| R36 | 470 ohms |
| R38 | 470 ohms |
| R42 | 3.6K ohms |
| R44 | 16.9K ohms |
| R45 | 1.3K ohms |
| R46 | 2.2K ohms |

FIG. 7 shows the physical package with the sensors and probe in a common assembly. The outer package is a sealed cylinder of durable, waterproof material, such as polyvinyl chloride, which provides containment and support for sensors 14, 16, 18, and 20 as well as housing 608 the sensor probe electronics assembly 200 in an enclosure which internally incorporates moisture-proof seals 640 between the sensors and the electronics assembly and seal 610 between the electronics assembly and the exterior. Signal wires 620 pass through the waterproof seal 410 at the end of the cylinder opposite to the sensor array.

Figure 8:
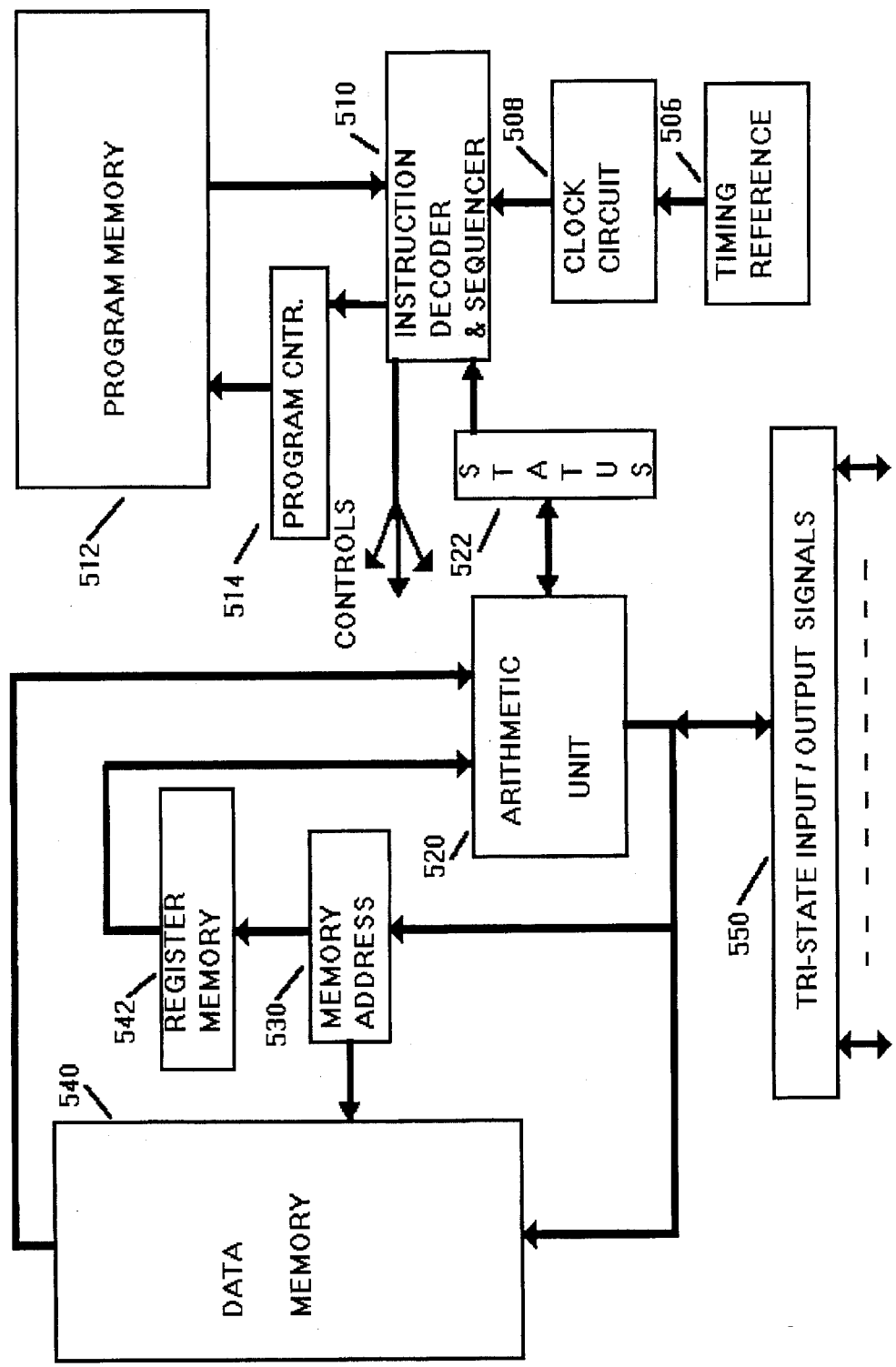
FIG. 8 shows architectural elements of probe controller 402.

FIG. 8 shows a representative architecture for the probe controller microprocessor, including the internal elements which make it operate in this application. Program memory 512 addressed by register 514 provides instructions to decoder 510 which issues control commands timed by clock circuit 508 controlled by timing reference 506. Data memory 540 and register memory 542 are selected by memory address register 530 to provide input to arithmetic unit 520, which communicates with the memories and with input-output signal interface 550. Status register 522 holds result flags which modify actions of sequencer 510.

OPERATION OF THE PREFERRED EMBODIMENT

In the preferred embodiment, the sensor probe incorporates 4 physical sensors, as shown in the figures. Sensor 20 is a capacitive impedance-type soil volume moisture sensor. Sensor 18 is a conductivity sensor. Sensor 16 is a thermistor temperature sensor. Sensor 14 is a combination electrode type pH sensor.

For most of the sensors there is an excitation circuit path and a sensing circuit path. The pH sensor is self-exciting but requires external power for its preamplifier. Sensors 6, 18, and 20 are powered by the excitation circuit.

In the preferred embodiment, the sensors are multiplexed into and share a portion of the input circuitry, both for excitation and for sensing. The excitation 412 and sensing 410 input multiplexers provide a measure of electrical isolation for the sensor input signals from one another and from the probe VCC and common when the individual input signals are de-selected.

The selection of the active sensor is determined by address signals from the probe controller.

As shown in FIG. 4, the sense signal outputs from each sensor connect to a pair of analog multiplexing circuits 410 and 412, each of which internally is an array of complimentary Metal Oxide Semiconductor transfer gates, i.e. linear bi-directional analog switches, controlled by a 1 of 8 binary decoder. Circuits 410 and 412 are high-impedance CMOS analog multiplexers equivalent to RCA type 4051. Binary coded logic signals from the probe controller operate path selection control signals 450 thru 452 for the input select multiplexer and signals 453 thru 455 for the excitation select multiplexer to cause, for each circuit, one of the N sensor inputs to be connected, in analog fashion, to the multiplexer output while the remaining inputs are simultaneously isolated from the circuit at a resistance of many megohms.

The probe controller controls the sensor multiplexer to select the sensor input signal to be measured. Coincident with the selection of the sensor, the probe controller steps the control sequence for causing excitation and converting the signal output from the selected sensor.

In the case of the pH sensor, sensor selection also requires application of power to the pH preamplifier via signal 468. Preamp power is switched off when the sensor is not in use to conserve energy.

Capacitor C1 is the charge-store for signal conversion. It charges from signal 469 via R1 or via signals 24 or 32 as selected by the probe controller through multiplexers 412 and 410. C1 discharges via resistance R2 during measurement conversion.

Typical values for the FIG. 4 circuit components are: C1 1000 picofarads C2 0.01 microfarad R1 10000 ohms R2 3.90M ohms R3 332K ohms R4 976K ohms R5 68.1K ohms R6 205K ohms R7 205K ohms D1 3.3 V zener diode.

Amplifier stage 310 amplifies input signal levels for sensing by comparator 312. The gain of amplifier 310 extends the dynamic range of the sensor measurement. The values shown for R3 and R4 yield a gain of about 3, but other gains may be desirable in special applications. Lower cost may be achieved by omitting this amplifier stage, while yet higher performance can be obtained by including a programmable gain function with the amplifier to permit dynamic scaling of the signal sensing process over several orders of magnitude under the management of the probe controller.

Comparator 312 is the final analog signal circuit in the sensor signal input path. In comparing the input signal from amplifier 310 with the 1.1 volt reference derived from R5, R6, R7, C2 and D1, the comparator circuit generates a digital low or high output, for an input voltage greater than or less than the reference value.

Where economy is an overriding consideration, the reference level comparator circuit can be omitted by routing the multiplexed sensor output analog signal directly into a digital input connected directly or through intermediate circuits to the probe controller. The preferred probe controller input signal circuit is one having a high impedance input characteristic with some hysteresis to prevent trigger jitter. In this case, the digital circuit low to high and high to low switching thresholds become the comparison sensing levels.

POWER SUPPLY LINE INTERFACE CIRCUITS

The sensor probe requires a reliable source of power for proper operation. Because the probe is intended for use in natural, unimproved locations, some of which are likely to be underground and distant from buildings, the power supply source can be remote at a distance of hundreds or thousands of feet from the probe assembly. Power to the sensor probe in a typical application may be supplied from a distant, remote source over poorly shielded or unshielded wiring.

More locally connected or internal batteries, gas or fluid operated turbines, solar cells, and other power sources can also supply supplemental or full power for the operation of the sensor probe.

In the wiring connected case for the preferred embodiment, the sensor probe power supply and signal wires can traverse distances as long as 25000 feet or more. These long connecting lines can expose the sensor probe and its internal circuits to induced electromagnetic fields from various natural and man-made sources, the effects of which can cause electrical noise, power surges, and transient voltage pulses of magnitude sufficient to damage an unprotected device. Induced radio frequency energy can potentially disrupt operation of the controlling probe controller, and voltage surges beyond the tolerance limits of the electronic devices internal to the sensor probe can cause permanent diminution of function in the device. The wiring may have large inductive and reactive components and may connect in a shared manner with control devices such as relays and solenoids which are themselves additional noise and surge sources.

The sensor probe power supply interface protects the probe from transient electrical effects which may appear on its supply lines. When the sensor probe is connected to its external power source through an isolation transformer or isolating DC to DC converter, the power supply interface can also provide the sensor probe with galvanic isolation from the supply line.

The sensor probe power supply circuit is shown in FIG. 6. Signal leads LINE1 and LINE2 from line circuit 496 connect to metal oxide varistor surge suppressor V1, bypass capacitor C26, bridge rectifier diodes D2 thru D5, and voltage regulator VR1. Optionally, the sensor probe has an internal charge store 488 which is a rechargeable battery, a large capacitor, or both, so that the probe can operate for finite durations without additional power from external supplies. Resistor R14 in series with diode D6 limits charging current to battery B1. Resistor R15 controls gated regulator VR2 so that it remains inactive while usable DC voltage is present at the input to VR1. Auxiliary power input 487 provides an alternate source for input power via diode D1. Resistors R44 and R46 form a voltage divider which supplies base of transistor Q1 via current limiting resistor R45. Values of R44 and R46 set the voltage for Q1 to switch on when input to VR1 exceeds a preset threshold. When switched active, Q1 sinks current from R42, causing line sense signal 466 to go low.

SENSOR PROBE CONTROLLER

The controller for the sensor probe consists of a single-component or multi-component programmable "microcomputer". In the preferred embodiment, the probe controller is a 16C57. The control unit may be physically implemented with various commercially available components, especially but not limited to single-chip I/O pin rich microcomputer control devices such as found in the Intel 803x-5x family, the Motorola 68HC05 family, and various others. While these devices vary in speed and circuit characteristics, they and many others are all readily adaptable to the measurement and control tasks set forth herein.

FIG. 8 is an illustrative block diagram of the microprocessor control 402 of the sensor probe, showing functional elements which are common to most such devices. Memories may be read-only, read-write, or a combination of the two, and may be combined in different arrangements in different microprocessor designs, but the general functions remain the same.

Instruction sequencer 510 uses program counter address register 514 to select and read program sequence instructions from program memory 512. The resulting control signals from sequencer 510 operate on all other elements of the microprocessor, as appropriate to the instruction being executed. Clock circuit 508, stabilized by timing reference 506, generates precisely-timed signals which operate the instruction sequencer and thereby operate the processes it controls. Some instructions cause sequencer 510 to read and write data to and from data memory 540 or register memory 542, using memory address register 530. Other instructions cause sequencer 510 to read and write data on the digital input-output signal interface 550. Status register 522 holds flags which result from instruction execution. Sequencer 510 changes program sequence during conditional operations as a result of specified status bits being true or false.

The circuit elements shown collectively as the probe controller in the sensor probe are merely illustrative of the elements generally combined in such controllers. Any programmable control able to operate the signals and perform the sequences herein may be used with similar functional result. Other combinations of elements which provide a similar result, issuing interface control signals and processing data at the appropriate times and in the desired manner, can be substituted for the elements shown.

OPERATIONAL SEQUENCES OF THE SENSOR PROBE

Sensor probe operation begins with a reset sequence when the device is first powered by application of 7 volt to 16 volt direct or alternating current to the line interface leads 496 or a 7 to 18 volt direct current into auxiliary power lead 487, or following a Reset command during a control data input transfer over signal path 496.

In the reset sequence, all outputs of controller 402 are disabled and microprocessor-specific device initialization values are forced into registers in the probe controller.

Immediately after reset initialization, the controller performs a sensor data measurement cycle. During a sensor data measurement cycle, data values are obtained and stored in sensor probe registers.

For data conversion, the combination of probe controller and the input circuits act as a multiple input charge-pumped voltage-to-frequency converter with integral digitization of the resulting time-domain signal values.

The time delay function is used in all measurement sequences. Probe controller register RR1 is set to a predetermined delay count value. A program counting loop delays for the time duration, proportional to the probe controller's internal clock rate, required to decrement the counter to zero.

The loop timing function is used in all measurement sequences. Probe controller register RR4 is set to a zero value. The level (high or low) of input signal 462 from comparator 312 is read and stored. A program loop then iteratively reads the level of input signal 462 from comparator 312. During each iteration of the loop, the value of register RR4 is incremented. The loop terminates when the current input value from signal 462 differs from the initial value.

In the first part of the measurement cycle, a reference value for calibration correction is measured for components R2 and C1.

Probe controller 402 sets input channel select signals 450, 451 and 452 to binary address value 0 and sets excitation select signals 453, 454 and 455 to binary address value 0. Probe controller signal 469 is programmed to output a high level equal to VCC, effectively connecting voltage VCC across R1 and C1 in series through the two multiplexers.

A time delay is inserted to provide for complete charging of C1.

Probe controller 402 sets input channel select signals 450, 451 and 452 to binary address value 7 and sets excitation select signals 453, 454 and 455 to binary address value 7, effectively disconnecting capacitor C1 and the input sense circuit from the sensors and excitation circuit. The timing function is immediately started. When it terminates, the value of timing register RR4 is transferred to holding register HR0. This value corresponds to the time constant for the amplified output of the C1, R2 RC circuit to decay to the reference threshold value of comparator 312 after having charged to the full VCC value.

In part two of the measurement cycle, moisture sensor 20 is read.

Capacitor C1 is charged as in the beginning of the R2 reference measurement cycle.

Probe controller 402 sets input channel select signals 450, 451 and 452 to binary address value 0 and sets excitation select signals 453, 454 and 455 to binary address value 1, effectively connecting capacitor C1 to lead 40 of sensor 20 and resistor R1 to lead 42 of sensor 20. This places Capacitor C1 in series with the unknown capacitance of sensor 20.

Another time delay is inserted, during which the charge of C1 decreases and the charge of sensor 20 increases until they divide voltage VCC in proportion to their relative capacitance values.

The measurement is then taken, in a manner similar to the part 1 reference measurement. Probe controller 402 sets input channel select signals 450, 451 and 452 to binary address value 7 and sets excitation select signals 453, 454 and 455 to binary address value 7, effectively disconnecting capacitor C1 and the input sense circuit from the sensors and excitation circuit. The timing function is immediately started. When it terminates, the value of timing register RR4 is transferred to holding register HR2. This value corresponds to the time decay constant for the amplified output of the C1, R2 RC circuit to reach the reference threshold value of comparator 312 when charged across the R1 CX C1 divider to the full VCC value. This value corresponds to the ratio of the capacitance value of capacitor C1 to the capacitance value of sensor 20.

To complete the measurement of sensor 20, the cycle as described above for sensor 20 is repeated, except that the addresses of the input multiplexers are set to 1 and 0 after initial charging of C1, rather than 0 and 1, thus reversing the polarity of the capacitive charge across the electrodes. The value from this second half of measurement cycle part two is stored in holding register HR3.

The effect of alternating between the two half cycles is to systematically reverse the polarity of the capacitively coupled current pulses seen by the soil medium in the region of the electrode surfaces. This eliminates artifact and distortion of the moisture measurement which might result from polarized charge accumulation in the soil medium were there no such alternation. For research purposes, it is informative to detect asymmetries in the polarization characteristic of the soil, both through capacitively and conductively transferred measurements. Additionally, monitoring polarizability provides a diagnostic signature for determining the correct operation of the probe and for detecting mechanical and electrical faults in the probe measuring process.

In the part three of the measurement cycle, the ion concentration conductivity sensor 18 is read: Capacitor C1 is charged as in the beginning of the R2 reference measurement cycle.

Probe controller 402 sets input channel select signals 450, 451 and 452 to binary address value 2 and sets excitation select signals 453, 454 and 455 to binary address value 3, effectively connecting capacitor C1 to lead 36 of sensor 18 and resistor R1 to lead 38 of sensor 18. This places the unknown resistance of the conduction path between electrodes 380 and 384 of sensor 18 in series with resistance R1 to VCC and with capacitor C1, which is charged to VCC potential, to common.

At this point, a brief time delay is inserted to allow the parasitic capacitive components of sensor 18 to charge from VCC via R1. This is desirable, for example, if substantial capacitance is present because of a long wire connection path between the sensing circuits, as shown in FIG. 4, to the sensor. This circumstance can occur in probes with multiple sensors spaced at distance intervals.

The measurement is taken by setting the drive signal 469 for resistor R1 to the same potential as common. The timing loop counter is started immediately. Capacitor C1 now discharges through resistance R2 and also through the series resistance of R1 and the unknown resistance of sensor 18, which are expected to be comparable to and often much less than the resistance of R2. When the timing function terminates, the value of timing register RR4 is transferred to holding register HR4. This value corresponds to the time decay constant for the amplified output of the C1, sensor 18, R1 RC circuit in parallel with the C1, R2 circuit to discharge to the reference threshold value of comparator 312 after having been charged to the full VCC value.

To complete the measurement of sensor 18, the cycle as described above for sensor 18 is repeated, except that the addresses of the input multiplexers are set to 3 and 2 after initial charging of C1, rather than 2 and 3, thus reversing the polarity of the capacitive charge across the electrodes. The value from this second half of measurement cycle part 3 is stored in holding register HR5.

In part four of the measurement cycle, temperature sensor 16 is read.

For convenience in wiring, lead 34 of the temperature sensor is connected in the practical embodiment to lead 42 of the moisture sensor at the sensor assembly or at the probe module assembly 200.

The Temperature sensor measurement process is similar to the conductivity sensor measurement, but is simpler because bipolar charging is not necessary.

Capacitor C1 is charged as in the beginning of the R2 reference measurement cycle.

Probe controller 402 sets input channel select signals 450, 451 and 452 to binary address value 4 and sets excitation select signals 453, 454 and 455 to binary address value 1, effectively connecting capacitor C1 to lead 32 of sensor 16 and resistor R1 to lead 34 of sensor 16. This places the unknown resistance of sensor 16 in series with resistance R1 to VCC and with capacitor C1, which is charged to VCC potential, to COMMON.

At this point, a brief time delay is inserted to allow the parasitic capacitive components of sensor 16 to charge from VCC via R1. This is desirable, for example, if substantial capacitance is present because of a long wire connection path between the sensing circuits, as shown in FIG. 4, to the sensor. This circumstance can occur in probes with multiple sensors spaced at intervals.

The measurement is taken by setting the drive signal 469 for resistor R1 to the same potential as common. The timing loop counter is started immediately. Capacitor C1 now discharges through resistance R2 and also through the series resistance of R1 and the unknown resistance of sensor 16, which are together much less than the resistance of R2. A typical resistance for Sensor 16 at 10 degrees C. is about 20K ohms.

When the timing function terminates, the value of timing register RR4 is transferred to holding register HR6. This value corresponds to the time decay constant for the amplified output of the C1, sensor 16, R1 RC circuit in parallel with the C1, R2 circuit to discharge to the reference threshold value of comparator 312 after having been charged to the full VCC value.

In the fifth part of the measurement cycle, the pH sensor is read.

Probe controller 402 sets input channel select signals 450, 451 and 452 to binary address value 5 and sets excitation select signals 453, 454 and 455 to binary address value 7, effectively connecting capacitor C1 to signal VPH 24 and disconnecting excitation circuit 412.

Capacitor C1, which was previously discharged, is allowed a time delay to charge to the potential of VPH.

Probe controller 402 sets input channel select signals 450, 451 and 452 to binary address value 5 and sets excitation select signals 453, 454 and 455 to binary address value 7, effectively connecting capacitor C1 to signal VPH and disconnecting excitation circuit 412.

The measurement is then taken in a manner similar to the part 1 reference measurement. Probe controller 402 sets input channel select signals 450, 451 and 452 to binary address value 7 and sets excitation select signals 453, 454 and 455 to binary address value 7, effectively disconnecting capacitor C1 and the input sense circuit from the sensors and excitation circuit. The timing function is immediately started. When it terminates, the value of timing register RR4 is transferred to holding register HR7.

This value corresponds to the time decay constant for the amplified output of the C1, R2 RC circuit to reach the reference threshold value of comparator 312 when charged to the voltage value of the pH probe output VPH.

In the sixth part of the measurement cycle, a reference value for calibration correction is measured for components R1 and C1.

Probe controller 402 sets input channel select signals 450, 451 and 452 to binary address value 0 and sets excitation select signals 453, 454 and 455 to binary address value 0. Probe controller signal 469 is programmed to output a high level, approximately equal to VCC, effectively connecting voltage VCC across R1 and C1 in series through the two multiplexers.

A time delay is inserted to provide for complete charging of C1.

Probe controller 402 sets signal 469 to common level without changing the configuration of selectors 410 and 412. The timing function is immediately started. When it terminates, the value of timing register RR4 is transferred to holding register HR1. This value corresponds to the time constant for the amplified output of the C1, R2+R1 RC circuit to decay to the reference threshold value of comparator 312 after having charged to the full VCC value.

| SENSOR PROBE HOLDING REGISTER ASSIGNMENTS | |
| --- | --- |
| HR0 | Calibration ref C1, R2 |
| HR1 | Calibration ref C1, R2 + R1 |
| HR2 | Moisture Sensor Forward Cycle |
| HR3 | Moisture Sensor Reverse Cycle |
| HR4 | Conductivity Sensor Forward Cycle |
| HR5 | Conductivity Sensor Reverse Cycle |
| HR6 | Temperature Sensor |
| HR7 | pH Sensor |
| HR8 | Corrected Moisture |
| HR9 | Corrected Conductivity |
| HR10 | Scaled Temperature |
| HR11 | Corrected pH |
| HR12 | Overflow and status flags |

VALUE ADJUSTMENT AND CORRECTION

After measurement values have been obtained for the references and for all sensors, internal measurement corrections and final values are computed for the moisture sensor readings.

Some corrections are computed in all cases. Others are computed only for optional configurations described as alternate embodiments. Scaled temperature is computed by subtracting the value of calibration reference in register HR1 from the temperature sensor value in HR6. This value is multiplied by integer temperature scaling constant KT, which expands the range of expected measurement values to more nearly fill the 16-bit number range. The scaled value is stored in holding register HR10.

Measurement values in registers HR2 and HR3 are summed and the sum divided by 2 to form the current moisture reading. This value may, optionally, be scaled to a range by subtraction of a baseline offset numeric constant and multiplication by a range normalization numeric constant, both constant values being predetermined for the particular physical geometry of the sensor plates and values of the circuit components. The scaled average value is stored in holding register HR8.

Measurement values in registers HR4 and HR5 are summed and the sum divided by 2 to form the current conductivity reading. Scaling may be performed as described for HR2 and HR3. The final scaled average value is stored in holding register HR9.

The value of the pH measurement value in register HR7 is subtracted from the calibration reference value in HR0. The resulting value is multiplied by integer scaling constant KP, which expands the range of expected measurement values to fill the 16-bit number range. The resulting number is stored in holding register HR11.

Because the Sensor probe contains externally programmable memory, scratchpad memory, and an arithmetic unit, it has the capability to perform many computations and to be configured for a wide range of functions that result from the data it acquires. The most common application is computation for scaling and processing scale units according to the needs of external devices.

In the application environment of the preferred embodiment, the independent controllers 50 and 52 contain their own intelligence for sequencing and arithmetic processing. In this environment, the sensor probe does not preprocess measurements but simply forwards the source data for the external controller to use according to its program. Holding registers HR0 through HR7 are transmitted without modification, using the complementary binary transmission (CBT) protocol described below.

In an alternate data transmission method embodiment, the sensor probe preprocesses the measurement data by performing calibration and value correction adjustments to the primary data. When calibrations are to be computed in this manner, EEPROM memory 494 may be increased in size, by substituting, during sensor probe assembly, a higher capacity part with the same electrical interface, so as to accommodate larger calibration lookup tables.

Figure 10:
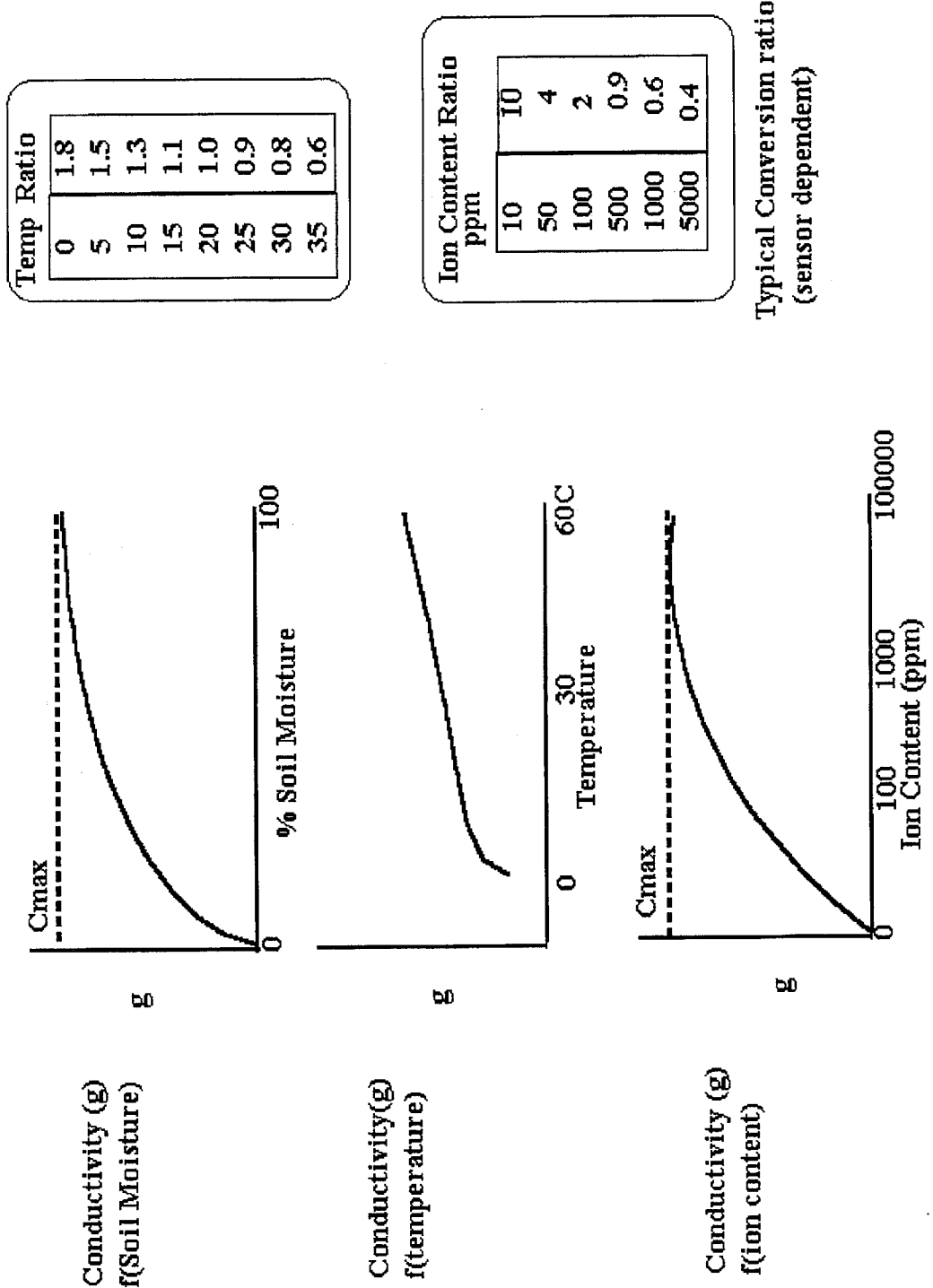
FIG. 10 shows the nature of relationships between soil temperature, conductivity, and moisture parameters.

FIG. 10 shows typical relationships between soil temperature, conductivity, and moisture parameters in regard to sensor 18 and sensor 20 measurements of soil moisture. The actual numerical relationships are strongly determined by the physical characteristics of the individual devices, the sensors, circuit component values and materials used in the fabrication of the probe assembly. Rather than converting the values to absolute units during internal operations, values and coefficients internal to the probe controller, are represented in non-dimensional units selected for convenience of internal representation, and factored by adjustment constants derived to make fullest use of the 16-bit number space.

Accordingly, each fabrication type or model of probe has the potential to have its own table of numbers for the conversions described below. The tables for individual units may be "trimmed" during manufacturing, testing, or field recalibration. For research applications requiring the highest absolute accuracy, superior results can be obtained when individual units are calibrated individually. The contents of the table memory 494 can be set for this configuration purpose over lines 444 and 445 during manufacture or recalibration. The process for writing into this circuit from an external system is described in National Semiconductor Corp. publication number 400069, 1992 edition. This document also describes the protocol used by probe controller 402 to read data from the memory.

In the case when value corrections are computed, the values for soil moisture, conductivity, and temperature are measured as described before.

Figure 11:
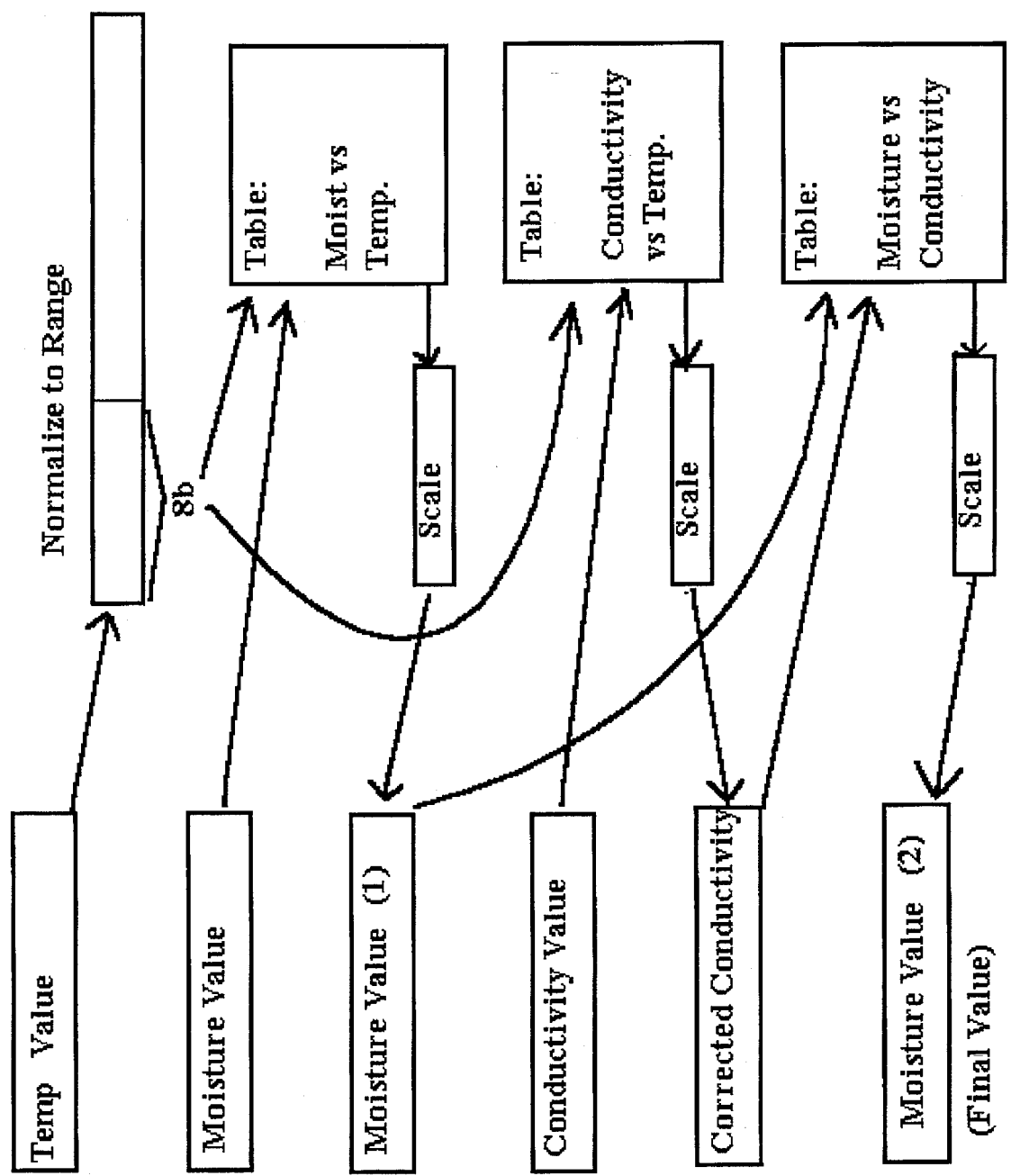
FIG. 11 shows the calculation method for computing adjusted measurement values using multiple parameters.

The moisture value is then adjusted by ratios derived from the temperature and ion measurements through table lookup, as illustrated in FIG. 11. The tables are stored as numeric values in the EEPROM memory 494 of the probe controller.

The correction ratio values are peculiar to particular calibration of each given sensor style and geometry. The physical phenomena which determine the calibration ratios are themselves quite general, but the constraints of cost and complexity make it desirable to have a limited numeric scale range for representing values, (16 bit integers in the preferred embodiment) combined with a simplified format for internal numeric computations, i.e., integer arithmetic. The net result of these constraints and objectives is that the most practical form for handling these values is as non-dimensional scaled numbers that are fitted to the range of the process of interest.

Scaling values are predetermined for the physical geometry and electronic characteristics of each specific configuration of sensors. The appropriate scale table values are written into sensor probe EEPROM over signal leads 444 and 445 by an external device during manufacturing or recalibration. Calibration, once accomplished, should remain stable for the working life of a given probe if the probe is not mechanically altered.

FIG. 11 illustrates the computation of corrected values for moisture, conductivity, and pH. The corrected values are computed as follows:

Using the most significant 8 bits from the current scaled temperature, the 8-bit scaling value for moisture sensor versus temperature is read from the 256×8 bit temperature/moisture table. The current moisture reading is multiplied by the scaling value to produce a 24-bit value, which is then scaled to a 16 bit value by truncating the four least and four most significant bits. If the four most significant bits are greater than zero, an overflow condition flag is set and the result value is set to the maximum 16-bit number. This yields the temperature corrected moisture value.

Using the most significant 8 bits from the current scaled temperature, the 8-bit scaling value for conductivity versus temperature is read from the 256×8 bit temperature/conductivity table. The current moisture reading is multiplied by the scaling value to produce a 24-bit value, which is then scaled to a 16 bit value by truncating the four least and four most significant bits. If the four most significant bits are greater than zero, an overflow condition flag is set and the result value is set to the maximum 16-bit number. This yields the temperature corrected conductivity value.

Using the most significant 8 bits from the temperature corrected conductivity value, the 8-bit scaling value for moisture versus conductivity is read from the 256×8 bit moisture/conductivity table. The temperature corrected moisture reading is multiplied by the conductivity scaling value to produce a 24-bit value, which is then scaled to a 16 bit value by truncating the four least and four most significant bits. If the four most significant bits are greater than zero, an overflow condition flag is set and the result value is set to the maximum 16-bit number. This yields the temperature and conductivity corrected moisture value. pH correction is accomplished in a slightly different manner, because the correction curve for pH versus temperature is proportional to the signed value of the difference from the current pH value and the value for pH7, which is the calibrated to be mid-range. If the scaled pH reading is more than 32768, then the value 32768 is subtracted from the reading, and a pHPLUS flag is set.

Using the most significant 8 bits from the current scaled temperature value, the 8-bit scaling value for pH sensor value versus temperature is read from the 256×8 bit temperature/pH table. The adjusted current pH reading is multiplied by the scaling value to produce a 24-bit value, which is then scaled to a 16 bit value by truncating the four least and four most significant bits. If the four most significant bits are greater then zero, an overflow condition flag is set and the result value is set to the maximum 16-bit number. If there is no overflow and the pHPLUS flag is true, 32768 is added to the value to produce the temperature corrected pH value.

LINE INTERFACE OUTPUT

After measurement values have been obtained (and, in the alternate embodiment, corrected as described) the line interface output sequence transfers data from the sensor probe.

Line interface data output transmission transfers measurement data to external control and logging elements such as independent controllers 50 and 52.

The same output information pattern is concurrently imposed on the optical data output 443 via modulator 442 and on the electrical line output 496 via modulator 440.

As shown in FIG. 6, the electrical data output from the probe controller signal 463 modulates NPN driver transistors Q2 and Q3 which switch off and on. The collector of driver transistor Q3 is connected to the sensor probe unregulated DC power supply via series resistance R36. When line output pulses are driven by probe controller 402, they appear in inverted form at output signal connection 497. This voltage mode output signal may be may be connected by wire to a receiving device or transducer. The current changes imposed on the power supply may also be sensed at the remote supply source.

Visible or infrared light-emitting diode D11 connects to driver transistor Q3. The resulting light output 443 may be observed directly or transmitted via an optical fiber for nearby or distant use. Additionally, voltage output 497 may be connected to an optical modulator such as the AT&T ODL50, or to a radio transmitter suitable for telemetry, or to a magnetic or electric field generator, or to a device which modulates the flow or emission of particles, or to an acoustic transducer, with or without additional carrier wave modulation.

In the preferred embodiment, the data output format is simple but comprehensive. A block of digital data containing the values of holding registers 0 through 12 is broadcast in series in a time sequenced pattern.

Each normal transmitted data bit begins with a high or true level for 333 microseconds. If the transmitted bit is a one, the output is high for the next 333 microseconds, otherwise it is low. For the third and last segment of the bit time, the output is low for 333 microseconds. The normal bit therefore always begins with a low to high transition and ends with a low level.

Prior to the first data byte of the register block is a synchronizing interval byte with a characteristic preamble pattern of 10101010 at the normal pulse timing rate of 1 ms per bit time.

After the preamble pattern, two "odd" bits are sent. The first odd bit is a high level for 2000 microseconds. The second odd bit is a low level for 2000 microseconds. Register data transmission commences immediately after the second odd bit.

Beginning with the least significant byte of the lowest numbered register, progressing to the most significant byte and then to the LSB of the next register, etcetera, the information for all registers is transmitted as a contiguous string of data bits, processed in 8-bit bytes.

Each data byte is transmitted least significant bit first. A byte is sent initially as itself and then as its 1's complement, to validate the bit content of the byte. If, at the receiving end, the exclusive OR of the data byte and the complement combined result in a byte containing all 1's, then the byte is accepted as valid. For example, the data value corresponding to decimal 85 will be transmitted as 01010101 10101010, which results in a value of 11111111 when the complimentary bytes are exclusive OR'ed together at the receiver.

Line interface data output transmission continues until all register bits, and their complements, have been transmitted. The line interface output circuit then becomes quiescent.

LOCAL CONTROL OUTPUT

Next, local control output signals 444 and 445 are driven, according to the following process:

Probe controller reads the level of control data input/output signal 445. If the signal is low, the local control output is set to the high impedance state and cannot not provide control output. The local control output sequence terminates. A flag bit is set in status register HR12 to indicate that control output is disabled. The test is repeated during each measurement cycle.

If local control output is not disabled, signals 444 and 445 provide control output signals for use by an external local control actuator circuit which may be responsive to moisture, conductivity, temperature, ph, or all of these.

Signal registers HR8, HR9, HR10, HR11 determine the local control output values.

The values of these registers are broadcast in series in a time sequenced pattern.

The precursor signal for the output pattern occurs when signal 445 is held low for a duration of 1000 milliseconds minimum. When signal 445 is brought high, the duration that it remains high specifies which of the four value registers is to be output. An interval up to 10 milliseconds designates register HR8, 20 ms for HR9, 30 ms for HR10, and 40 ms for HR11.

At the end of the signal 445 high level output period, signal 444 transitions from low to high and remains high for a time duration in proportion to the value contained in the parameter register. For each unit of value in the parameter register, the output signal remains high for 100 microseconds. With 16-bit parameter values, this yields a maximum time period of 6.5 seconds for the maximum output value.

IDLE STATE

After measuring, adjusting values, messaging to the remote controllers and providing local control, the sensor probe enters the idle state.

While idle, the sensor probe controller 402 executes a timing loop in which it counts down the timing interval to the next measurement sample time. In the preferred embodiment, the internally preset timing interval is 10 minutes between samples, or 6 times per hour when power is continuously applied. At the end of each timing interval, the measurement process begins anew as described above.

During the idle state, the sensor probe periodically checks line sense signal 466. If this signal is active (low) for a duration of 2 seconds or more, the timing delay interval immediately ends and a new measurement cycle starts.

PHYSICAL PACKAGE

The physical shape of the sensor probe may take various forms. In the preferred embodiment, the probe is housed in a plastic cylinder which provides mechanical protection and sealing against moisture intrusion, while acting as a foundation surface for the sensors. To protect against moisture intrusion, the probe is filled with a low density conformal rubber compound, although this is not a requirement for proper functioning.

The several sensors 14, 16, 18 and 20 are distributed over the surface of one end of the sensor probe assembly, as shown in FIG. 7. The pH sensor, which is itself cylindrical, is shown inserted into and nested within the end of the sensor probe cylinder. Bulkhead seal 640 prevents moisture intrusion from the sensor end of the assembly, and provides a moisture tight passthrough for the wire lead connections from sensors 14, 16, 18, and 20 to electronics module 200, which sits in cylinder 208 aft of seal 640. At the end of module 200 opposite from seal 640 is water-tight seal and cable passthrough 610 which provides the connection path for signal, power and data wires from the probe to external connections.

CONCLUSION, RAMIFICATIONS, AND SCOPE OF THE INVENTION

While my above description contains many specificities, these should not be construed as limitations on the scope of the invention, but rather as an exemplification of certain practical embodiments thereof. Many other variations are possible.

Other combinations of sensor principles, excitation, attachment and implementation are compatible with the function and concepts of the invention.

Values of the circuit components may be varied to suit the goals of particular applications and sensor geometries.

The basic clock rate and timing for operation of the sequencer may be increased or decreased.

Many variations in connection of the described internal functional elements of the probe may be undertaken to achieve variations of functional result within the scope of the purpose of the invention, especially with regard to digitizing and encoding methods, sequencing and control methods for conserving power, interfaces and sequences for operating functionally more complex sensors than in the embodiments here, enhanced methods for communicating and methods for operably altering configuration connections between sensors, probe, paths, and controllers.

Many diverse configurations are possible for the sensor probe in combination with external control, actuating, and signaling devices.

Configuration selecting switches can be connected, in conventional manner, to the expansion connector 484 and may be then used for selecting alternate interface signal modes, sample rates, etc.

By simple program changes, numerous variations of communication protocol may be used for transfer and exchange of information to and from the sensor probe, including RS-232 and CCIT type serial protocols, statistical modulation schemes, etc.

In the one configuration of the sensor probe, the sensor probe connects, over short or long lines, with a communicating device or external controller which gathers data from the sensor probe and initiates irrigation, fertilization, pumping, and similar control actions based on data obtained from one or more sensor probes in communication with the external controller.

In a second configuration of the sensor probe, the sensor probe connects to an external controller, as above, and the external controller also provides threshold information to the sensor probe to enable it to initiate control actions directly and independently via control output 444 and similar paths. The most commonly desired control action consists of switching an output signal level to high to enable and low to disable the connection of operating power to an electrical water flow actuating valve.

In a third configuration of the sensor probe, the sensor probe operates alone as a measuring device and controller of external devices. The external devices compare internally stored reference values to control values transmitted from the sensor probe to determine control actions. The sensor probe may also accept programming and configuration inputs from a programming interface, which may be permanently connected or detachable for convenience when not in use. The programming interface may provide inputs in analog form, in which case they are read by controller 402 in the manner of reading sensors, or in digital form, in which case they are read as binary input signals using the CBT protocol or alternate binary protocols cited above or any other serial binary protocol.

In a fourth configuration of the sensor probe, the sensor probe acts as in the first, second, or third configuration, but also stores information for subsequent transfer by broadcast or retrieval by interaction with a temporarily or permanently connected control or transfer device.

DATA LOGGING

The sensor probe can also save data samples as a self-contained logging device when a large-capacity memory is connected, during manufacture, to option connector 484, and appropriate timing and storage, and retrieval sequences are included in the controller program. In the logging configuration, measurements from a large number of samples can be taken and saved for delayed transmission or gathering up by an operator.

In the data-logging configuration, data sampling may be controlled by a time delay or an external stimulus signal. As a third alternative, data may be sampled at regular intervals but saved only when certain conditions are met, such as exceeding a threshold value or when a particular relationship of values occurs among several of the sensors. In the "exception-logging" mode of operation, it is normally necessary to preserve the event time as well as the values observed.

The sensor probe can maintain an internal measure of "real time" in various ways, and from that time reference can perform operations on a schedule. In the simplest manner, in cases where power is applied continuously to the sensor probe from an external source or the internal battery or a combination of the two, time may be accumulated by a counting function of the probe controller, referenced to the time at which power was initially applied. Where a sensor probe is intended for use as a stand-alone device without an external controlling element, the preferred embodiment can also incorporate a separate time of day circuit for independent long-term timing accuracy and reference to standard clock/calendar time.

By including additional moisture sensors and other sensors in the same assembly or connectably attached, a sensor probe can be made with the same elements for measuring an entire soil moisture profile at multiple depths. By correlating the measurement results from the plural sensors, a more meaningful and predictive determination of total available soil moisture can be obtained. The principles of the sensor probe described here are specifically adaptable to designs where multiple sets of sensors are combined in a single probe to simultaneously measure moisture, and/or temperature, and conductivity at two or more depths in the soil profile.

Using the embodiment here described, many variations in measurement method may be employed, through minor control sequence alterations, for different modes of operation of the conductivity and moisture sensors. Of particular interest are methods which intentionally do not balance polarization of the plates, and methods which vary the rate and onset and decay of the excitation.

Many physical embodiments and variations in packaging are possible and appropriate for various uses of the invention. The invention is especially suited to use with a variety of novel modes and mechanisms of powering and signal communication as may be dictated by practical purposes.

Accordingly, the scope of the invention should not be determined by the embodiments illustrated, but by the appended claims and their legal equivalents.

What is claimed is:

1. A sensor system for measuring and controlling a predetermined quantity, comprising:

means for isolatably connecting one or more sensors to said system isolated from one another;

means providing bipolar excitation of said sensors:

means for establishing a desired value of said quantity;

said sensors producing an output signal determining the relation of the quantity to its desired value;

means for transforming an output signal of the sensors into a first digital signal form related to the output signal;

means for transforming the digital signal into a second digital signal for transmission over a path to a remote receiving device;

means for responding to receipt of said second digitized signal to produce a correction signal indicative of a correction to be made to return the quality to the desired level, feedback means employing digitalized correction signals in the format received to actuate means situated for correcting the quantity to the desired value.

2. A sensor for sensing a physical parameter, a probe for supplying excitation in a controlled quantity to said sensor and for converting the sensor's output to a digital signal indicative of said physical parameter, control means for accepting information from said probe and comparing it with a predetermined value to determine a correction value said control means responding to said correction value to produce a digital signal indicative of a corrective action to be taken to cause said physical parameter to achieve said predetermined value, and means responsive to the said digital signal to cause said physical parameter to approach said predetermined value.

3. A sensor system according to claim 2 further comprising isolation means for isolating said sensors from interfering phenomena occurring in the path between said sensor and said probe by switching all leads of the sensors to or from communication with other parts of the system.

4. A sensor system according to claim 3 wherein said isolation means between said sensors provides isolation of said sensors from excitation signals, signal inputs from the other sensors isolation from control signals to the other sensors and power to the other sensors.

5. A sensor system according to claim 2 wherein said probe includes a capacitor in series with said sensor, a charge pump for charging said capacitor, said sensor having an internal impedance that varies as a function of the physical parameter to be measured, said capacitor being charged and discharged at a rate that is a function of said internal impedance.

6. A sensor system according to claim 3 further comprising a comparator for producing a signal indicative of a correction to be made, a sensor signal conditioner, a probe including a time controlled probe controller having sensor input from said sensor signal processor and excitation output circuit receiving control signals from said controller, an imput circuit from comparator circuit to said probe controller, said probe controller controlling excitation output signals as a function of said comparator input signals to initiate correction of a condition to be corrected, and means isolating said probe from control devices, line interference and the power source.

7. A sensor system according to claim 2 wherein said means for producing a first digital signal produces a serial stream of digitally coded numerical information, and means for producing the second digital signal as a serial stream of digital information for initiating actuation of the means for correcting the quantity to the desired value.

8. A sensor system according to claim 7 further comprising a container at the situs of measurement, said container having located therein said sensor and said probe.

9. A sensor system according to claim 8 wherein said sensor comprises at least one electrode supported rigidly in said container, signal conductors connected to said electrode and a reference potential, an electrolyte positioned in said container with voids therein, and a moisture permeable barrier between said electrode and environment surrounding said container, said electrode and electrolyte producing an electrical voltage in the presence of moisture.

10. A sensor system according to claim 1 further comprising at least two sensors concurrently sensing a condition to be controlled to produce a single signal indicative of such condition.

* * * * *